(12) United States Patent
Prasher et al.

(10) Patent No.: US 9,079,403 B2
(45) Date of Patent: Jul. 14, 2015

(54) INKJET PRINTER HAVING PRINTHEAD PLUMBED FOR OPTIMIZED COLOR MIXING

(71) Applicant: Zamtec Limited, Dublin (IE)

(72) Inventors: Jognandan Kumar Prasher, North Ryde (AU); Adrian Peter Bisson, North Ryde (AU); Brian Robert Brown, North Ryde (AU); Mile Jercevic, North Ryde (AU); Galo David Jaramillo, North Ryde (AU)

(73) Assignee: Memjet Technology Ltd. (IE)

(*) Notice: Subject to any disclaimer, the term of this patent is extended or adjusted under 35 U.S.C. 154(b) by 0 days.

(21) Appl. No.: 14/190,869

(22) Filed: Feb. 26, 2014

(65) Prior Publication Data

US 2014/0176644 A1    Jun. 26, 2014

Related U.S. Application Data

(63) Continuation of application No. 13/615,127, filed on Sep. 13, 2012, now Pat. No. 8,702,206.

(60) Provisional application No. 61/537,063, filed on Sep. 21, 2011.

(51) Int. Cl.
*B41J 2/21* (2006.01)
*B41J 2/145* (2006.01)
*B41J 2/155* (2006.01)
*C09D 11/32* (2014.01)

(52) U.S. Cl.
CPC ........ *B41J 2/145* (2013.01); *B41J 2/155* (2013.01); *C09D 11/32* (2013.01); *B41J 2202/20* (2013.01)

(58) Field of Classification Search
USPC .............................................. 347/43
See application file for complete search history.

(56) References Cited

U.S. PATENT DOCUMENTS

| 5,668,584 | A | * | 9/1997 | Broder et al. ............ 347/102 |
| 5,724,079 | A | * | 3/1998 | Helinski et al. ............ 347/43 |
| 5,845,056 | A | | 12/1998 | Kohler et al. |
| 6,007,182 | A | * | 12/1999 | Matsubara et al. ............ 347/43 |
| 6,860,586 | B2 | | 3/2005 | Ishikura |
| 2007/0247490 | A1 | * | 10/2007 | Sheahan et al. ............ 347/42 |
| 2008/0043078 | A1 | | 2/2008 | Wachi |
| 2008/0145068 | A1 | | 6/2008 | Mizutani |

OTHER PUBLICATIONS

PCT/EP2012/068206 International Search Report and Written Opinion, Dec. 17, 2012, 13 pages.

* cited by examiner

*Primary Examiner* — Stephen Meier
*Assistant Examiner* — Alexander D Shenderov
(74) *Attorney, Agent, or Firm* — Cooley LLP

(57) ABSTRACT

An inkjet printer including an inkjet printhead positioned relative to a media feed direction. The printhead has a plurality of color planes for ejecting different inks, each color plane including a nozzle row defined in a nozzle face of the printhead, and each nozzle in a respective color plane being supplied with a same ink. The printhead is plumbed such that a first color plane positioned furthest upstream with respect to the media feed direction ejects yellow ink and a second color plane neighboring the first color plane ejects black ink.

8 Claims, 14 Drawing Sheets

INKJET PRINTER HAVING PRINTHEAD PLUMBED FOR OPTIMIZED COLOR MIXING

PRIORITY

This application is a Continuation of U.S. application Ser. No. 13/615,127, filed Sep. 13, 2012, which claims priority under 35 U.S.C. 119(e) to U.S. provisional application No. 61/537,063 entitled "PRINTER FOR MINIMIZING ADVERSE MIXING OF HIGH AND LOW LUMINANCE INKS AT NOZZLE FACE OF INKJET PRINTHEAD", filed on Sep. 21, 2011, the content of which is hereby expressly incorporated by reference in its entirety for all purposes.

FIELD OF THE INVENTION

This invention relates to inkjet printing and methods for improving print quality. It has been developed primarily for minimizing adverse color mixing on nozzle plates of inkjet printheads.

BACKGROUND OF THE INVENTION

The present Applicant has developed a plethora of thermal bubble-forming printheads and thermal bend-actuated printheads. The Applicant's thermal bubble-forming printheads include those with suspended heater elements (as described in, for example, U.S. Pat. No. 6,755,509; U.S. Pat. No. 7,246,886; U.S. Pat. No. 7,401,910; and U.S. Pat. No. 7,658,977, the contents of which are incorporated herein by reference) and those with embedded or bonded heater elements (as described in, for example, U.S. Pat. No. 7,377,623; U.S. Pat. No. 7,431,431; US 2006/250453; and U.S. Pat. No. 7,491,911, the contents of which are incorporated herein by reference). The Applicant's thermal bend-actuated printheads typically have movable paddles defined in a nozzle plate of the printhead (as described in, for example, U.S. Pat. No. 7,926,915; U.S. Pat. No. 7,669,967; and US 2011/0050806, the contents of which are incorporated herein by reference).

The Applicant's Memjet® printheads are characterized by a relatively high nozzle density compared to commercially-available printheads. Memjet® printheads typically comprise a plurality of color planes with a pair of offset nozzle rows in each color plane. A key advantage of Memjet® printheads is the relatively narrow print zone resulting from integration of a plurality of color planes on each printhead integrated circuit. The color planes of the Memjet® printhead are spaced closely together, which obviates any alignment problems between the color planes during dot-on-dot printing. By contrast, widely spaced color planes necessitate complex media feed mechanisms to achieve proper alignment, adding to the complexity of other known pagewidth printing systems (e.g. HP Edgeline).

Typically, a distance between nozzles rows from neighboring color planes in a Memjet® printhead is in the range of 25 to 200 microns or 50 to 100 microns. This close spacing of color planes produces problems which are unique to such printheads. A significant problem of closely spaced nozzle rows from different color planes is one of color mixing on the nozzle plate of the printheads. If, for example, black ink mixes into a yellow ink on the nozzle plate, then this may adversely affect print quality as well as impacting on printhead maintenance routines. The present Applicant has identified two mechanisms which manifest in adverse ink mixing on the nozzle plate: ink wetting onto the nozzle plate; and fibres or particulates bridging between rows of nozzles.

Hitherto, the problem of ink mixing on the nozzle plate of inkjet printheads has been addressed in the art by applying hydrophobic surface treatments to the nozzle plate. For example, the present Applicant has described nozzle plates having a coating of a hydrophobic siloxane polymer, which is applied during MEMS fabrication of the printhead (see, for example, U.S. Pat. No. 7,938,974; U.S. Pat. No. 7,669,967, the contents of which are herein incorporated by reference). However, such coatings add to the cost and complexity of printhead fabrication. Moreover, they do not control a direction of color mixing so as to favor acceptable color mixing over adverse color mixing.

It would be desirable to provide a means for minimizing adverse color mixing on inkjet nozzle plates, which does not rely on nozzle plate coating treatments. Alternatively, it would desirable to provide a means for minimizing adverse color mixing on inkjet nozzle plates, which complements and/or improves the effectiveness of existing nozzle plate coating treatments.

SUMMARY OF THE INVENTION

In a first aspect, there is provided an inkjet printer comprising:

an inkjet printhead comprising a plurality of color planes for ejecting a plurality of different inks, each color plane comprising at least one nozzle row defined in a nozzle face of said printhead, each nozzle in a respective color plane being supplied with a same ink, wherein said printhead is plumbed such that a first color plane ejecting a first ink having a relatively low luminance is sandwiched between second and third color planes ejecting respective second and third inks having a relatively high luminance; and a plurality of ink reservoirs in fluid communication with the printhead, said ink reservoirs containing the first, second and third inks, wherein an amount of surfactant in the first ink is at least 0.4 wt % greater than an amount of surfactant in the second and third inks.

Typically, the first ink is a color ink, while the second and third inks are black inks. As used herein, the term "color ink" refers to any non-black ink used in inkjet printing. Typical examples of color inks are cyan, magenta, yellow, red, green and blue, as well as light cyan, light magenta and spot colors. Other types of "color inks" may include infrared inks, ultraviolet inks, metallic inks etc. An infrared ink, for example, is defined herein as a "color ink" even though it may have virtually no color. In the context of the present disclosure, color inks such as 'light cyan' and 'cyan' are not considered to be "different color inks", because their intermixing on the nozzle face does have a serious visual impact. Likewise, 'light magenta' and 'magenta' are not considered to be different color inks, because their intermixing on the nozzle plate does not have a serious visual impact.

The printer according to the first aspect is based on the combination of a unique ink set and a unique plumbing arrangement in an inkjet printhead. This combination enables control of the flow of inks across the nozzle plate of the printhead in order to minimize the effects of adverse color mixing. Notably, the printer does not attempt to prevent all color mixing on the nozzle plate. In terms of producing adverse print defects, the visual impact of inks mixing on the nozzle plate is not equal. For example, the mixing of cyan, magenta or yellow ink into black ink does not produce highly undesirable print defects. Essentially, the black ink remains black irrespective of whether a color ink has been mixed with the black ink. However, the mixing of black ink into cyan, magenta or yellow ink produces highly undesirable print defects, because the black ink seriously affects the visual appearance (i.e. hue and chroma) of color inks. It is this type of undesirable mixing which the present invention aims to minimize.

Initially, it was envisaged by the present inventors that control of inks across the nozzle plate could be achieved by making use of the known Marangoni effect—that is, the propensity of fluids having a low surface tension to flow towards regions having a high surface tension. However, it was found that surface tension differences between inks was not sufficient to control their flow across the nozzle plate. Even when, for example, a black ink had a significantly higher surface tension than color inks, the black ink was still observed to flow into color inks on the nozzle plate. Thus, it appeared that surface tension gradients alone were not effective in controlling ink flow across the nozzle plate.

However, it was found, surprisingly, that controlling an amount of surfactant in each ink was highly effective in controlling ink flow across the nozzle plate. In particular, it was found that it was necessary for a color ink to contain at least 0.4 wt. % more surfactant than the black ink in order to minimize the flow of black ink into the color inks on the nozzle plate. Based on this observation, the plumbing order of the printhead and the surfactant concentration in each ink of an ink set may be optimized so as to minimize adverse color mixing on the nozzle face of the printhead.

In connection with the first aspect described above, the printhead is optionally plumbed such that each color plane ejecting one of the relatively low luminance inks (e.g. color ink) has at least one neighboring color plane ejecting a relatively high luminance ink (e.g. black ink).

Optionally, the color planes of the printhead are arranged in an alternating sequence of black ink and color inks.

Optionally, the printhead comprises five color planes for ejecting black ink, a first color ink, a second color ink and a third color ink, wherein the color planes are plumbed in the sequence: first color ink-black ink-second color ink-black ink-third color ink e.g. CKMKY; MKCKY; MKYKC; RKGKB; GKRKB; RKBKG etc.

Optionally, each color ink is selected from the group consisting of: cyan, magenta and yellow. Alternatively or additionally, each color ink may be selected from the group consisting of: red, green and blue. Alternatively or additionally, each color ink may be selected from the group consisting of: ultraviolet inks and infrared inks, which may be colorless or virtually colorless to the human eye.

Optionally, the inks are dye-based aqueous inks.

Optionally, the inks are pigment-based aqueous inks.

Optionally, the relatively high luminance ink (e.g. black ink) has a higher surface tension than each relatively low luminance ink (e.g. color ink). Typically, the black ink has a surface tension at 25° C. in the range of 38 to 43 mN/m and each color ink has a surface tension at 25° C. in the range of 30 to 41 mN/m.

Optionally, the amount of surfactant in each color ink is at least 0.6 wt. % greater than the amount of surfactant in the black ink. Optionally, each color ink contains from 0.4-1.2 wt. % more surfactant than the black ink. Typically, the black ink contains 0.1 to 0.4 wt. % surfactant while each color ink contains 0.6 to 1.5% surfactant.

Each color plane of the printhead may comprise one or more nozzle rows. For example, a color plane may comprise 1, 2, 3 or 4 nozzle rows, which all receive and eject the same ink. Optionally, each color plane comprises a pair of respective nozzle rows, which usually contain nozzles offset from each other. The distance between nozzle rows of the same color plane is usually less than the distance between nozzle rows from neighboring color planes.

The color planes are spaced apart transversely across the printhead. The distance between nozzle rows from neighboring color planes is typically less than 200 microns or less than 100 microns. Optionally a distance between nozzle rows from neighboring color planes is in the range of 30 to 180 microns, optionally in the range of 40 to 150 microns, or optionally in the range of 50 to 100 microns. The close spacing between neighboring color planes is particularly problematic in terms of color mixing on the nozzle face.

Optionally, the nozzle face is defined by a nozzle plate comprised of a ceramic material. Optionally, the nozzle plate is comprised of a material selected from the group consisting of: silicon oxide, silicon nitride and silicon oxynitride. Ceramic nozzle plates are very robust and suitable for MEMS fabrication of printheads. However, ceramics of this type are relatively wetting and potentially exacerbate the problem of color mixing, especially with closely spaced color planes. It is a particular advantage of the present invention that adverse color mixing is minimized even on relatively wetting nozzle plates. However, the present invention is equally suitable for use with other nozzle faces, for example, nozzle plates coated with a hydrophobic polymer coating as described in U.S. Pat. No. 7,938,974, the contents of which are herein incorporated by reference.

Optionally, the printhead is a stationary pagewidth printhead, such as those described hereinbelow. The printhead may be comprised of a plurality of printhead integrated circuits butted end-on-end across a pagewidth. However, the present invention is equally suitable for use with other types of printhead, especially multi-color printheads with closely spaced color planes (i.e. less than 500 microns or less than 200 microns).

In a second aspect, there is provided a printhead suitable for use in the printer described in connection with the first aspect. Accordingly, the second aspect provides an inkjet printhead comprising a plurality of color planes for ejecting a plurality of different inks, each color plane comprising at least one nozzle row defined in a nozzle face of said printhead, each nozzle in a respective color plane being supplied with a same ink, wherein said printhead is plumbed such that a first color plane ejecting a non-black ink is sandwiched between a pair of color planes ejecting black ink.

Optional features described above in connection with the first aspect are, of course, equally applicable to the printhead according to the second aspect.

In a third aspect, there is provided an ink set suitable for use in the printer described above in connection with the first aspect. Accordingly, the third aspect provides an ink set for minimizing adverse color mixing at a nozzle plate of an inkjet printhead, said ink set comprising a plurality of aqueous inks including a relatively high luminance ink and one or more relatively low luminance inks, each of said inks comprising a surfactant, wherein an amount of surfactant in the first relatively high luminance ink is at least 0.4 wt % greater than an amount of surfactant in said relatively low luminance inks.

As described in more detail below, each ink of the ink set is formulated as a dye or pigment contained in an aqueous-based ink vehicle. Specific examples of suitable dyes and pigments are described below. Preferably, each ink of the ink set is a dye-based ink. A typical ink vehicle suitable for use in the present invention may comprise one or more of: 8 to 15 wt. % ethylene glycol; 6 to 12 wt. % 2-pyrrolidinone; 1 to 5 wt. % glycerol; 1 to 5 wt. % 1-propanol; and from 2 to 20 wt % of at least one oxyalkylene compound selected from the group consisting of: diethylene glycol, triethylene glycol, tetraethylene glycol and pentaethylene glycol.

Optionally, each ink of the ink set comprises only one surfactant, which is typically a nonionic surfactant. Optionally, the nonionic surfactant is ethoxylated 2,4,7,9-tetramethyl-5-decyne-4,7-diol (Surfynol® 465).

Optionally, each relatively low luminance ink (e.g. color ink) of the ink set comprises from 0.1 to 0.3 wt. % of the surfactant.

Optionally, the relatively high luminance ink (e.g. black ink) of the ink set comprises from 0.6 to 1.4 wt. % of the surfactant.

Optionally, each ink of the ink set comprises from 2 to 8 wt. % of a dye.

In a fourth aspect, there is provided a kit (e.g. an inkjet printing system) comprising: an inkjet printhead comprising a plurality of color planes for ejecting a plurality of different inks, each color plane comprising at least one nozzle row defined in a nozzle face of said printhead, each nozzle in a respective color plane being supplied with a same ink, wherein said printhead is plumbed such that a first color plane ejecting a first ink having a relatively low luminance is sandwiched between second and third color planes ejecting respective second and third inks having a relatively high luminance; and
a plurality of ink reservoirs for installation in the printer, said ink reservoirs containing the first, second and third inks, wherein an amount of surfactant in the first ink is at least 0.4 wt % greater than an amount of surfactant in the second and third inks.

In a fifth aspect, there is further provided the novel use of an ink set for minimizing adverse color mixing at a nozzle face of an inkjet printhead. The ink set employed in the fifth aspect comprises a plurality of dye-based or pigment-based aqueous color inks and a dye-based or pigment-based aqueous black ink, each of the inks comprising a surfactant, wherein an amount of surfactant in each color ink is at least 0.4 wt % greater than an amount of surfactant in the black ink. The printhead defined in the fifth aspect is typically as described above in connection with the second aspect.

As described above, the present invention may be used in connection with ink sets comprising black ink and color inks. More generally, the present invention is applicable to any ink set, where the visual impact of a low luminance ink mixing with a high luminance ink is not severe.

The luminance of CMY inks on white paper are as follows: C (30%), M (59%) and Y (11%). Black (K) nominally has 100% luminance on white paper. An "invisible" ink, such as an invisible infrared or ultraviolet ink, nominally has a luminance of 0% on white paper.

Since yellow has a relatively low luminance, then it is highly desirable to avoid mixing either cyan or magenta inks into yellow ink, because this would have a highly deleterious visual impact. Conversely, mixing yellow ink into either magenta or cyan inks has less visual impact, although there will still of course be some visual impact.

Making use of the relatively high luminance of black and magenta, and the relatively low luminance of yellow and IR inks, then a number of optimal printhead configurations and ink sets would be readily apparent to the person skilled in the art.

For example, a printhead with four color planes may be optimally configured as follows: CKYM, with a complementary ink set in which cyan and yellow inks have at least 0.4 wt. % more surfactant than black and magenta inks. Thus, cyan may mix into black with minimal visual impact, and yellow may mix into black or magenta with minimal visual impact. However, mixing of black into cyan or yellow is minimized, and mixing of magenta into yellow is minimized.

A Netpage printer (see, for example, U.S. Pat. No. 6,987,573, the contents of which are incorporated herein by reference) may comprise a printhead with five color planes optimally configured as follows: CKYM(IR) or YM(IR)KC. In each configuration, the higher luminance inks (M and K) are sandwiched between lower luminance inks (Y, IR and C). The complementary ink set is formulated such that the cyan, IR and yellow inks have at least 0.4 wt. % more surfactant than the magenta and black inks.

A printer (e.g. photo printer) having three color planes may be optimally configured as CYM, with a complementary ink set in which the yellow ink has at least 0.4 wt. % more surfactant than the cyan and magenta inks.

A photo printer having five color planes may be optimally configured as C1C2YM2M1, with a complementary ink set in which the yellow ink has at least 0.4 wt. % more surfactant than neighboring cyan and magenta inks (C2 and M2). In the case of this photo printer, C1 and C2 (as well as M1 and M2) may be redundant color planes. In other words, C1 and C2 eject identical cyan inks, and M1 and M2 eject identical magenta inks. The redundancy in these color planes assists in minimizing the visual impact of yellow ink mixing into the neighboring cyan and magenta color planes, especially in combination with 'dot-at-time' redundancy (as described in U.S. Pat. No. 7,465,017, the contents of which are herein incorporated by reference), wherein pairs of redundant color channels contribute equally to each line of printed dots. Alternatively, one of the cyan color planes (C1 or C2) may be light cyan and one of the magenta color planes (M1 or M2) may be light magenta. Even in the case where C1 and C2 (and M1 and M2) eject non-identical inks, such as cyan and light cyan, the visual impact of yellow mixing into cyan and magenta color planes is still minimal.

In an sixth aspect, there is provided inkjet printhead comprising a plurality of color planes for ejecting different color inks, each color plane comprising at least one nozzle row defined in a nozzle face of the printhead, wherein the printhead is plumbed such that a color plane ejecting yellow ink is sandwiched between a color plane ejecting magenta ink and a color plane ejecting cyan ink.

Optionally, the printhead has redundant color planes ejecting magenta and cyan inks.

Optionally, the printhead comprises five color planes for cyan, magenta and yellow inks, wherein the color planes are plumbed in the sequence: first magenta-second magenta-yellow-first cyan-second cyan.

Other optional features of the printhead according to the eighth aspect are as described above in connection with the first aspect.

In a seventh aspect, there is provided an inkjet printer comprising:
  the inkjet printhead according to the sixth aspect; and
  cyan, magenta and yellow ink reservoirs, each being in fluid communication with at least one color plane of the printhead,
wherein an amount of surfactant in the yellow ink is at least 0.4 wt % greater than an amount of surfactant in the magenta and cyan inks.

In an eighth aspect, there is provided an ink set for minimizing adverse color mixing at a nozzle plate of an inkjet printhead, the ink set comprising a cyan ink, a magenta ink and a yellow ink, each of the inks comprising a surfactant, wherein an amount of surfactant in the yellow ink is at least 0.4 wt % (or at least 0.6 wt. %) greater than an amount of surfactant in the magenta and cyan inks.

Optional features of ink vehicles for inks contained in ink set according to the eighth aspect are typically as described above in connection with the ink set according to the third aspect.

BRIEF DESCRIPTION OF THE DRAWINGS

Various embodiments of the present invention will now be described by way of example only with reference to the accompanying drawings, in which.

DETAILED DESCRIPTION OF THE INVENTION

The present invention is particularly suitable for use with the Applicant's Memjet® printheads, which comprise closely spaced color planes on a single printhead. As foreshadowed above, such printheads are more prone to adverse color mixing the nozzle face than other prior art printheads. However, it will be appreciated that the present invention is suitable for use in any printhead where it is desirable to avoid adverse color mixing between different color planes on the nozzle face.

Pagewidth Printhead and Printer

Figure 1:
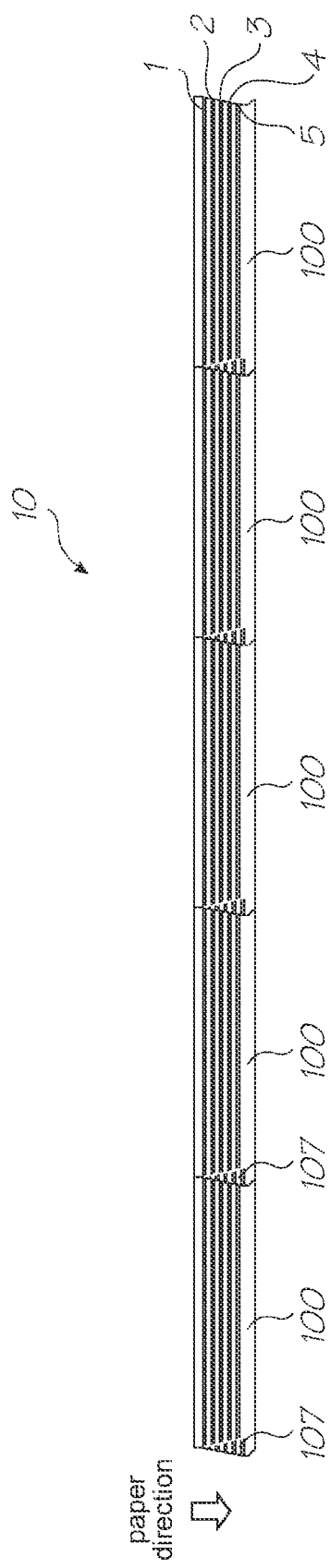
FIG. 1 is a plan view of a printhead comprised of abutting printhead integrated circuits.

Referring to FIG. 1, the Memjet® printhead 10 is a pagewidth printhead comprised of a plurality of printhead integrated circuits (ICs) 100 butted end-on-end. Each printhead integrated circuit 100 typically has a length of about 20 mm. The number of butting printhead ICs 100 in a particular printhead will, of course, depend on the type of printer. For example, a 4" printhead (suitable for photo or label printing) typically comprises five abutting ICs 100, as shown in FIG. 1. An A4 printhead (suitable for home and office use) typically comprises eleven abutting printhead ICs 100. More printhead ICs are obviously employed in a wide-format printhead. The present invention is not limited to any particular width of printhead.

The Memjet printhead 10 is typically comprised of five color planes 1, 2, 3, 4 and 5 spaced apart transversely across the printhead in a paper feed direction. Each color plane comprises a pair of offset nozzle rows, which extend longitudinally along the length of the printhead. For example, the color plane 1 comprises nozzle rows 1$a$ and 1$b$, as shown more clearly in FIGS. 2 and 3. Likewise, color plane 2 comprises nozzle rows 2$a$ and 2$b$; color plane 3 comprises nozzle rows 3$a$ and 3$b$ etc. Each color plane is characterized in that all nozzles 102 in the same color plane are supplied with and eject the same ink from a common ink reservoir.

Each of the five color planes 1, 2, 3, 4 and 5 of the printhead 10 may eject a different colored ink. However, the Memjet® printhead 10 usually incorporates at least some redundancy in the color planes. For example, there may be a two color planes ejecting black ink, while the other three color planes eject cyan, magenta and yellow ink, respectively. Redundancy helps to improve overall print quality by improving optical density and minimizing the visual impact of defective nozzles (see U.S. Pat. No. 7,465,017). Of course, redundant color channels usually receive ink from the same bulk ink reservoir of a printer—this ink is merely channeled into redundant color planes of the printhead.

Figure 3:
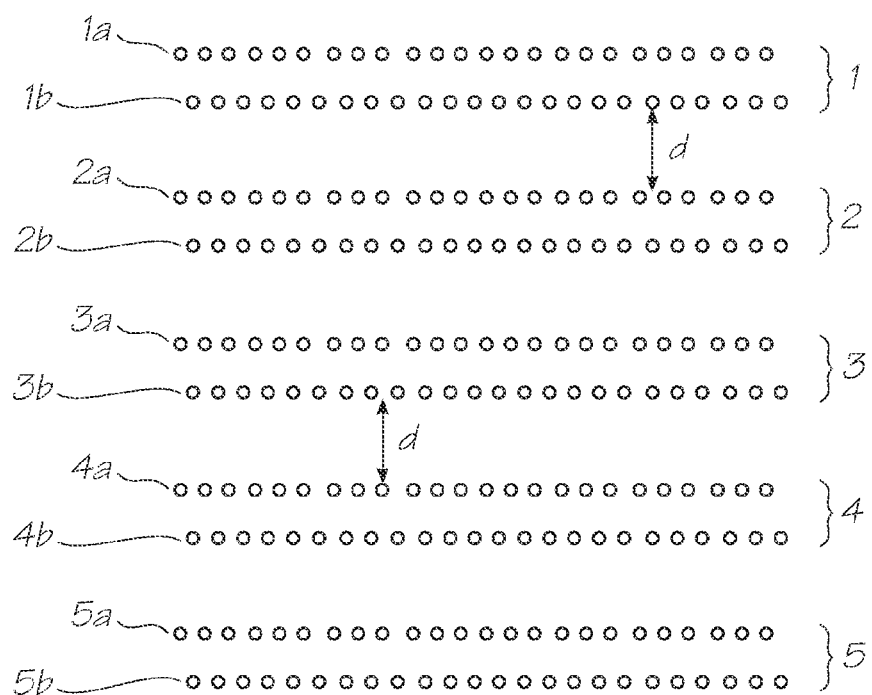
FIG. 3 shows schematically the arrangement of color planes and nozzle rows in the printhead integrated circuit shown in FIG. 2.

Referring to FIG. 3, a distance d between nozzle rows from neighboring color planes (e.g. nozzle row 1$b$ and 2$a$) is about 73 microns in the Memjet® printhead 10. Hence, there is potential for intermixing of different color inks across the nozzle face 101 of the printhead 10 between neighboring color planes. Adverse color mixing across the nozzle face 101 is exacerbated when the nozzle face is defined by a relatively wetting nozzle plate material, such as silicon nitride or silicon oxide.

A nozzle pitch between neighboring nozzles in the same nozzle row is 31.75 microns. The pair of nozzle rows in a same color plane are offset by a distance of 15.875 microns along a longitudinal axis of the printhead, such that one nozzle row prints 'even' dots of a line and the other nozzle row prints 'odd dots' of a line. In this way, the Memjet printhead achieves a printed dot-spacing of about 15.875 microns in each line of print, or about 1600 dpi.

Figure 2:
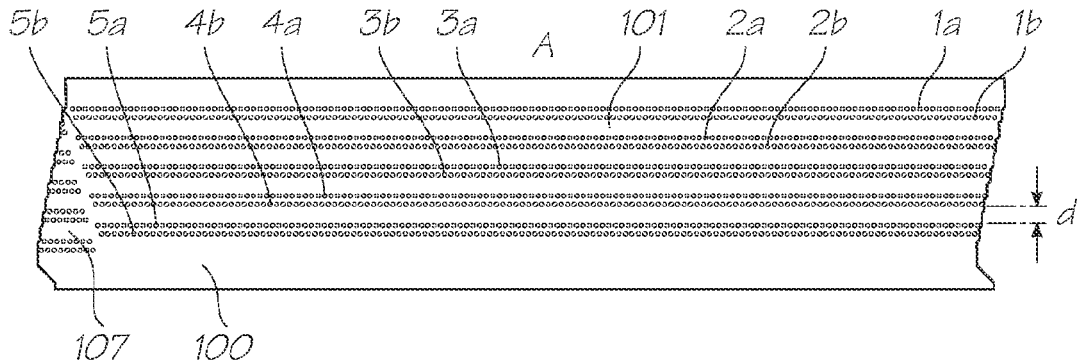
FIG. 2 is plan view of a single printhead integrated circuit.
Figure 4:
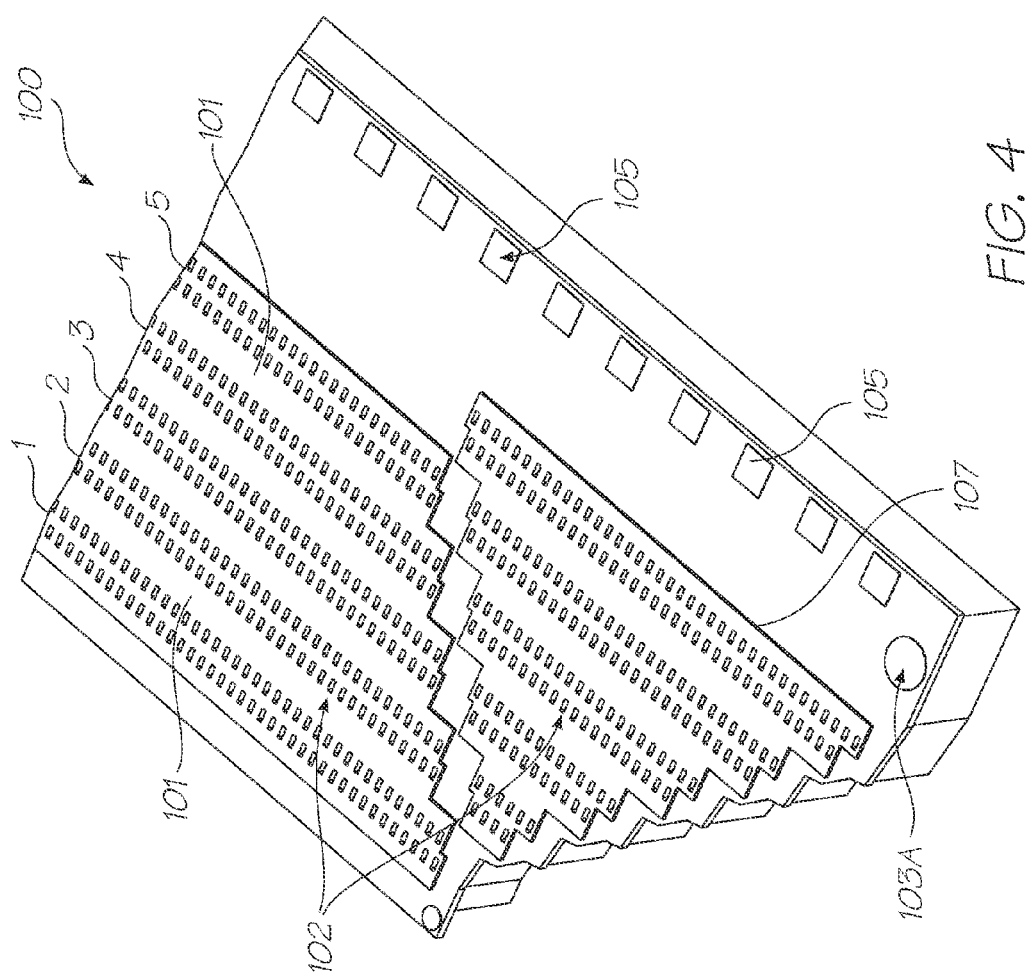
FIG. 4 is a magnified front perspective view of the printhead integrated circuit shown in FIG. 2.

Referring to FIGS. 1, 2 and 4, it will be seen that in regions where abutting printhead ICs 100 are joined, there is a displaced (or dropped) triangle 107 of nozzle rows. These dropped triangles 107 allow printhead ICs 100 to be joined, whilst effectively maintaining a constant nozzle pitch along each row. This arrangement also ensures that more silicon is provided at the edge of each printhead IC 100 to ensure sufficient linkage between butting ICs.

A timing device (not shown) is used to delay firing nozzles 102 in the dropped triangles 107, as appropriate. Whilst control of the operation of the nozzles 102 is performed by a printhead controller ("SoPEC") device, compensation for the dropped rows of nozzles may be performed by CMOS circuitry in the printhead, or may be shared between the printhead and the SoPEC device. A full description of the dropped nozzle arrangement and control thereof is contained in U.S. Pat. No. 7,390,071, the contents of which are herein incorporated by reference.

Figure 5:
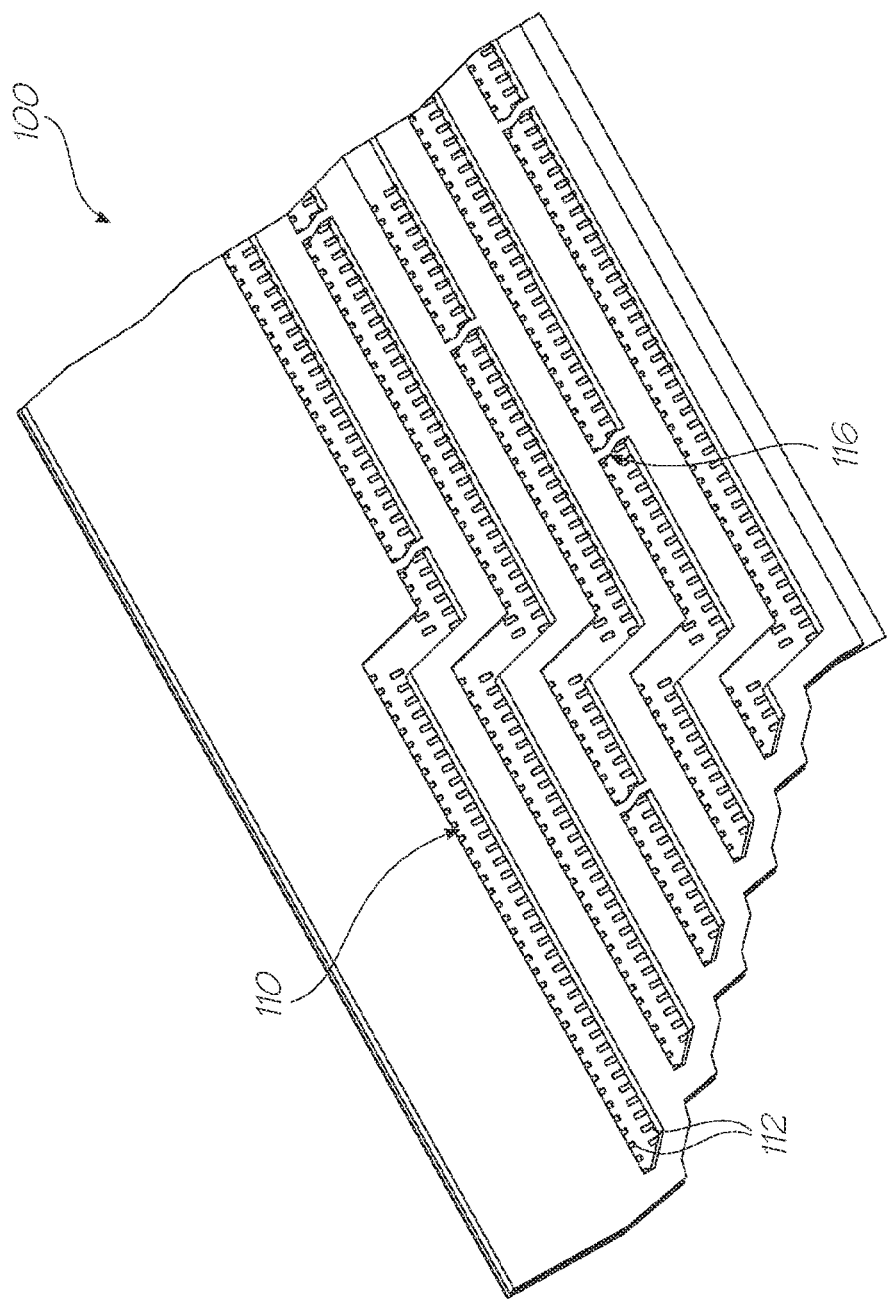
FIG. 5 is a magnified rear perspective view of the printhead integrated circuit shown in FIG. 2.

Referring now to FIG. 5, there is shown an opposite backside face of the printhead integrated circuit 100. Ink supply channels 110 are defined in the backside of the printhead IC 100, which extend longitudinally along the length of the printhead IC. These longitudinal ink supply channels 110 meet with nozzle inlets 112, which fluidically communicate with the nozzles 102 in the frontside. Each of the five ink supply channels 110 corresponds with one of the color planes of the printhead, such that one ink supply channel supplies ink to the pair of nozzle rows contained in one color plane.

Figure 6:
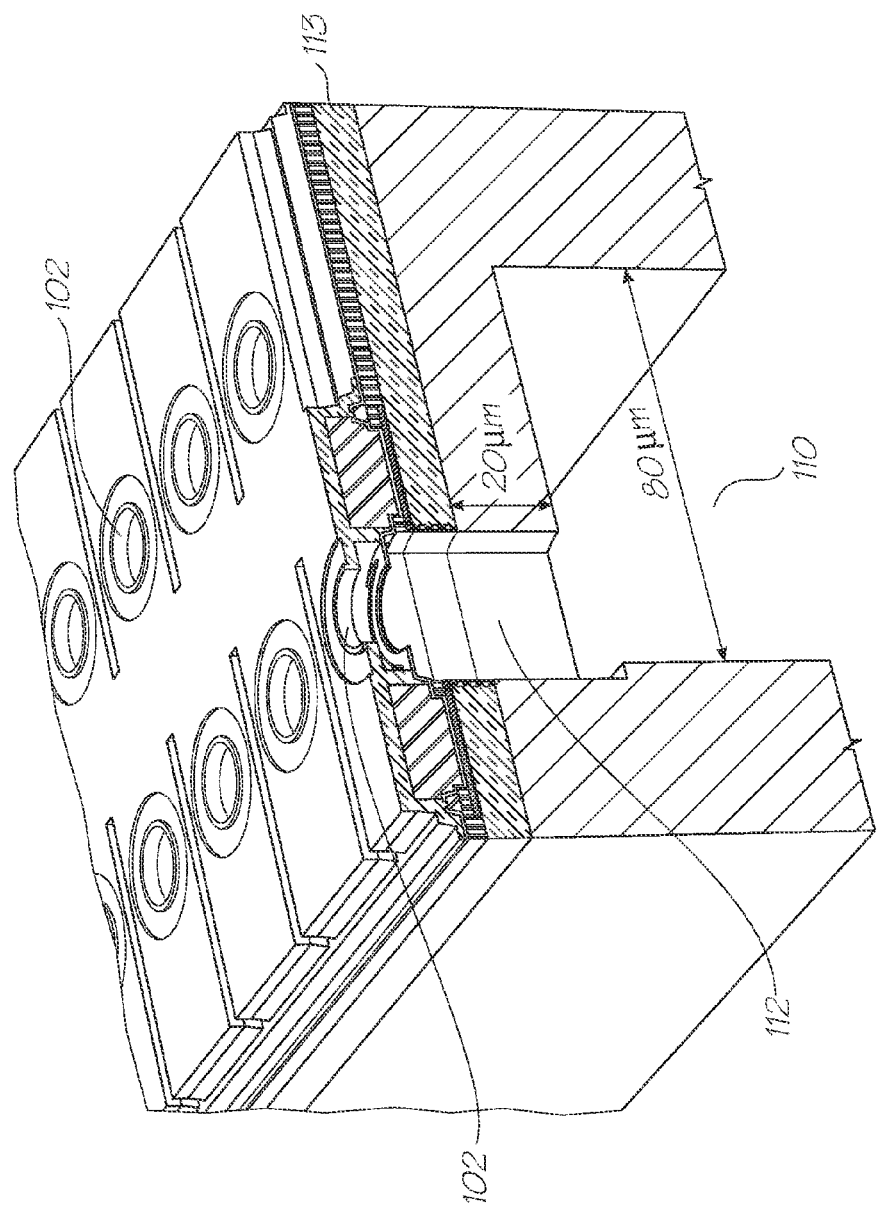
FIG. 6 is a cutaway perspective through one color plane of the printhead integrated circuit shown in FIG. 2.
Figure 7:
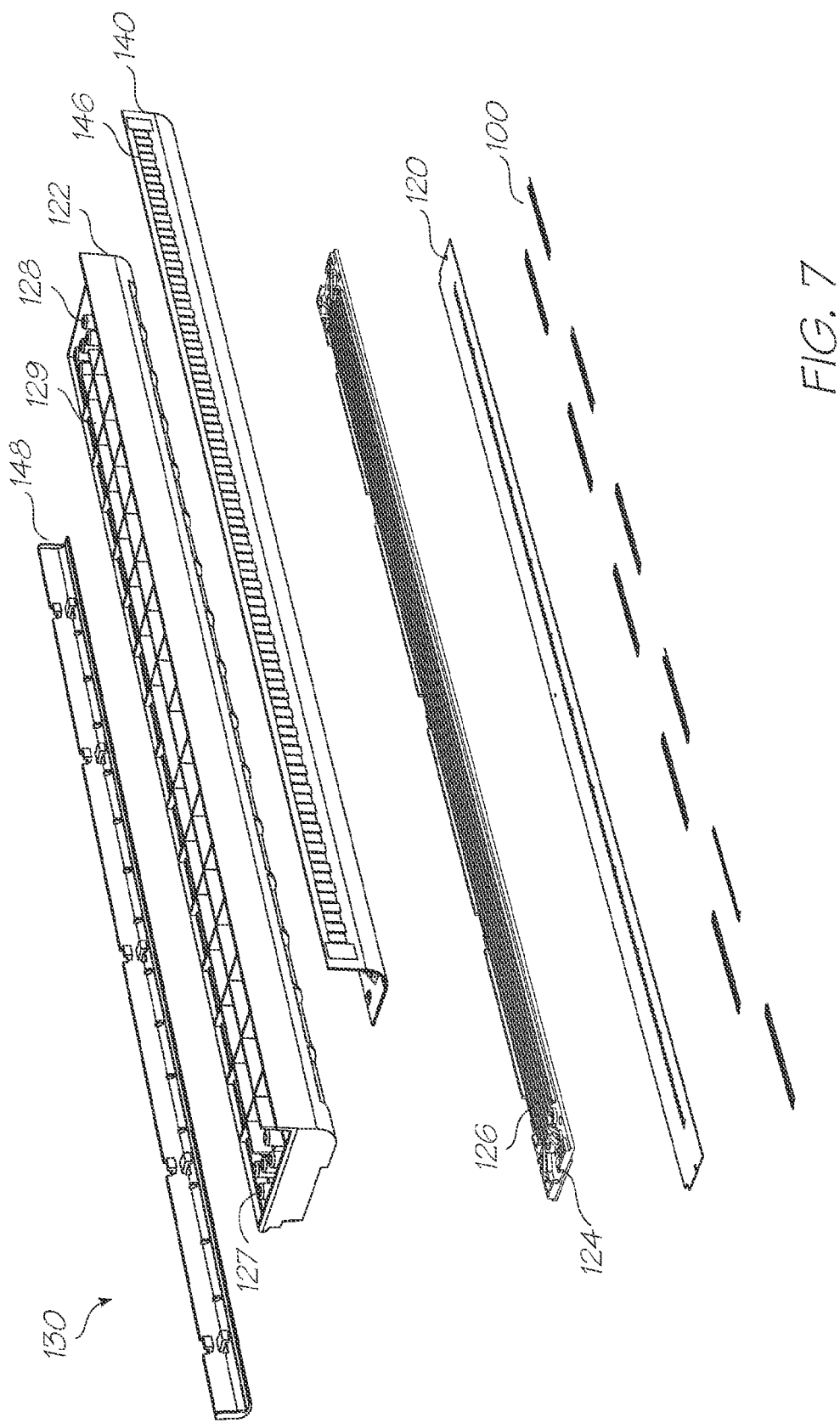
FIG. 7 is an exploded perspective view of a printhead assembly.

FIG. 6 is a cutaway perspective of part of a printhead IC showing fluidic communication between a nozzle 102, a nozzle inlet 112 and a backside ink supply channel 110. As shown in FIG. 6, the nozzle 102 ejects ink via a suspended bubble-forming heater element (as described in, for example, U.S. Pat. No. 6,755,509; U.S. Pat. No. 7,246,886; U.S. Pat. No. 7,401,910; and U.S. Pat. No. 7,658,977, the contents of which are incorporated herein by reference). However, other types of nozzle actuation are equally suitable for use in the printheads described herein. For example, nozzle actuation may be via an embedded heater elements (as described in, for example, U.S. Pat. No. 7,377,623; U.S. Pat. No. 7,431,431; US 2006/250453; and U.S. Pat. No. 7,491,911, the contents of which are incorporated herein by reference). Alternatively, the Applicant's thermal bend-actuated printheads typically have movable paddles defined in a nozzle plate of the printhead (as described in, for example, U.S. Pat. No. 7,926,915; U.S. Pat. No. 7,669,967; and US 2011/0050806, the contents of which are incorporated herein by reference).

Returning to FIG. 5, the longitudinally extending backside ink supply channels 110 are divided into sections by silicon bridges or walls 116. These walls 116 provide the printhead IC 100 with additional mechanical strength in a transverse direction relative to the longitudinal channels 110.

Ink is supplied to the backside of each printhead IC 100 via an ink supply manifold in the form a two-part LCP molding. Referring to FIGS. 7 to 10, there is shown an exploded view of an A4 printhead assembly comprising eleven printheads IC 100, which are attached to the ink supply manifold via an adhesive film 120.

The ink supply manifold comprises a main LCP molding 122 and an LCP channel molding 124 sealed to its underside. The printhead ICs 100 are bonded to the underside of the channel molding 124 with the adhesive IC attach film 120. The upperside of the LCP channel molding 124 comprises five LCP main channels 126, which connect with respective ink inlets 127 and ink outlets 128 in the main LCP molding 122. The ink inlets 127 and ink outlets 128 fluidically communicate with ink tanks and an ink supply system, which supplies ink to the printhead at a predetermined hydrostatic pressure.

The main LCP molding 122 has a plurality of air cavities 129, which communicate with the LCP main channels 126 defined in the LCP channel molding 124. The air cavities 129 serve to dampen ink pressure pulses in the ink supply system.

Figure 8:
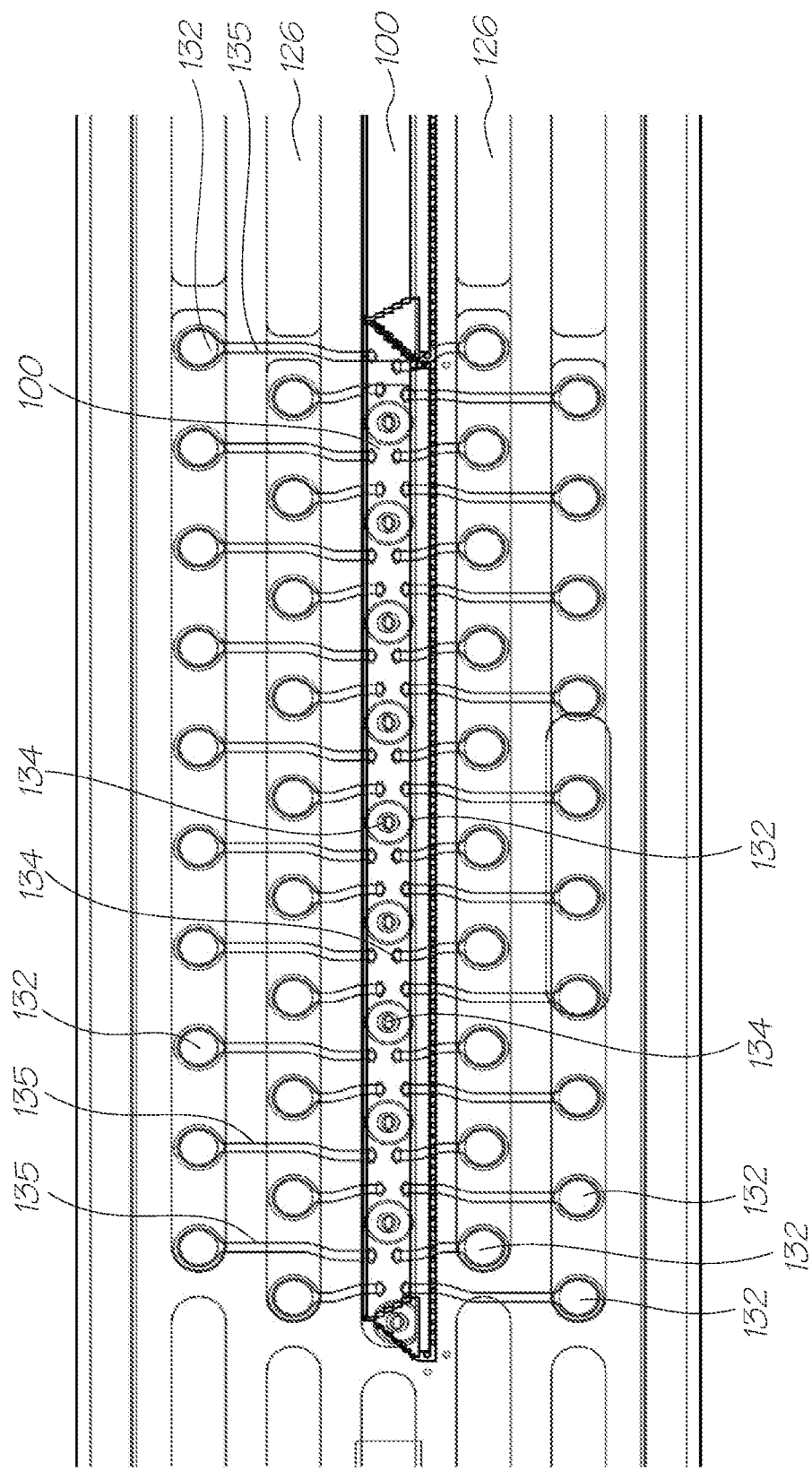
FIG. 8 is a plan view of fluidic connections to a printhead integrated circuit in the printhead assembly shown in FIG. 7.

Referring to FIG. 8, at the base of each LCP main channel 126 are a series of ink supply passages 132 leading to the printhead ICs 100. The adhesive film 120 has a series of laser-drilled supply holes 134 so that the backside of each printhead IC 100 is in fluid communication with the ink supply passages 132.

The ink supply passages 132 are arranged in a series of five rows. A middle row of ink supply passages 132 feed ink directly to the backside of the printhead IC 100 through laser-drilled holes 134, whilst the outer rows of ink supply passages 132 feed ink to the printhead IC via micromolded channels 135, each micromolded channel terminating at one of the laser-drilled holes 134.

Figure 9:
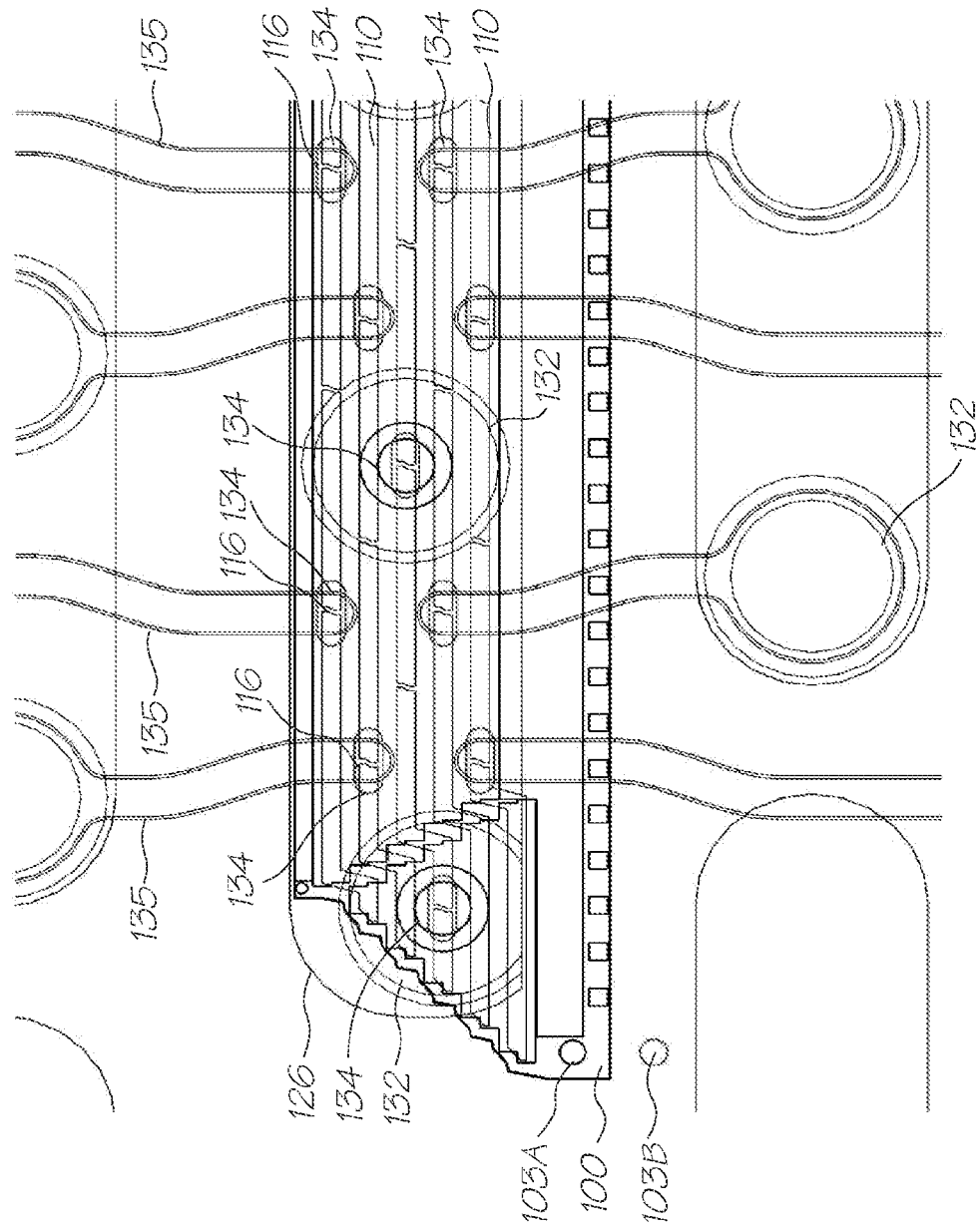
FIG. 9 is a magnified view of the fluidic connection shown in FIG. 8.

FIG. 9 shows in more detail how ink is fed to the backside ink supply channels 110 of the printhead ICs 100. Each laser-drilled hole 134, which is defined in the adhesive film 120, is aligned with a corresponding ink supply channel 110. Generally, the laser-drilled hole 134 is aligned with one of the transverse walls 116 in the channel 110 so that ink is supplied to a channel section on either side of the wall 116. This arrangement reduces the number of fluidic connections required between the ink supply manifold and the printhead ICs 100.

To aid in positioning of the ICs 100 correctly, fiducials 103A are provided on the surface of the ICs 100 (see FIG. 4). The fiducials 103A are in the form of markers that are readily identifiable by appropriate positioning equipment to indicate the true position of the IC 100 with respect to a neighbouring IC. The adhesive film 120 has complementary fiducials 103B, which aid alignment of each printhead IC 100 with respect to the adhesive film during bonding of the printhead ICs to the ink supply manifold. The fiducials 103A and 103B are strategically positioned at the edges of the ICs 100 and along the length of the adhesive IC attach film 120.

Returning now to FIG. 4, the printhead IC 100 has a plurality of bond pads 105 extending along one of its longitudinal edges. The bond pads 105 provide a means for receiving data and/or power from the printhead controller ("SoPEC") device to control the operation of the inkjet nozzles 102. The bond pads 105 are connected to an upper CMOS layer of the printhead IC 100. As shown in FIG. 6, each MEMS nozzle assembly is formed on a CMOS layer 113, which contains the requisite logic and drive circuitry for firing each nozzle.

Referring again to FIG. 7, a flex PCB 140 bends around the main LCP molding 122 and has terminals wirebonded to the bond pads 105 of the printhead ICs 100. Wirebonding arrangements between the flex 140 PCB and the bond pads 105 are described in more detail in U.S. Pat. No. 7,824,013, the contents of which is herein incorporated by reference.

A paper guide 148 is mounted on an opposite side of the LCP molding 122, with respect to the flex PCB 140, and completes the printhead assembly 130.

The printhead assembly 130 is designed as part of a user-replaceable printhead cartridge 20, which can be removed from and replaced in a print engine of an inkjet printer. Hence, the flex PCB 140 has a plurality of contacts 146 enabling power and data connections to electronics, including the SoPEC device, in the printer body.

Figure 10:
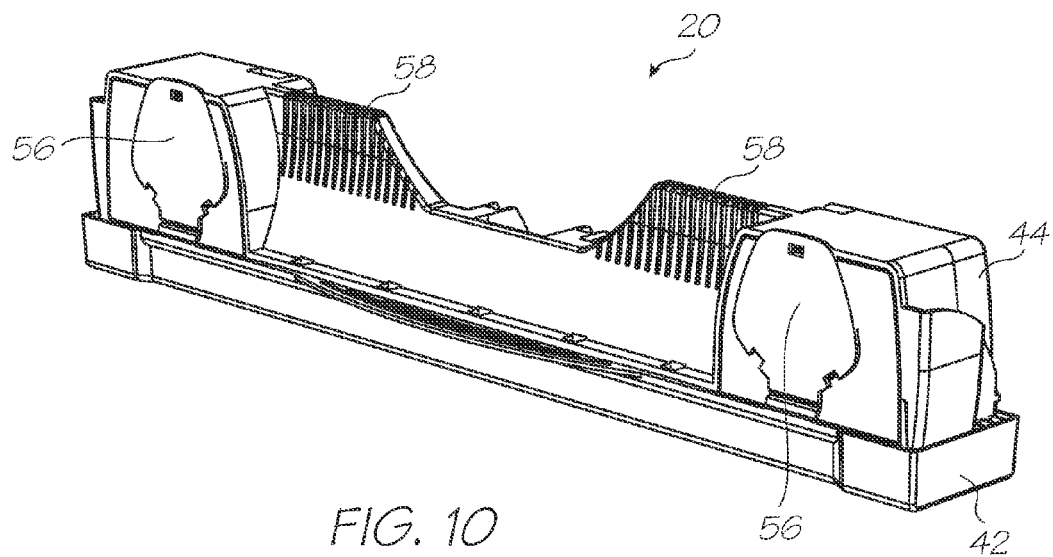
FIG. 10 is a perspective view of a printhead cartridge.

FIG. 10 is a perspective of the complete printhead cartridge 20. The printhead cartridge 20 has a top molding 44 and a removable protective cover 42. The top molding 44 has a central web for structural stiffness and to provide textured grip surfaces 58 for manipulating the cartridge during insertion and removal. The base portion of the protective cover 42 protects the printhead ICs 100 and line of contacts 146 prior to installation in the printer. Caps 56 are integrally formed with the base portion and cover ink inlets and outlets (see 54 and 52 of FIG. 12).

Figure 11:
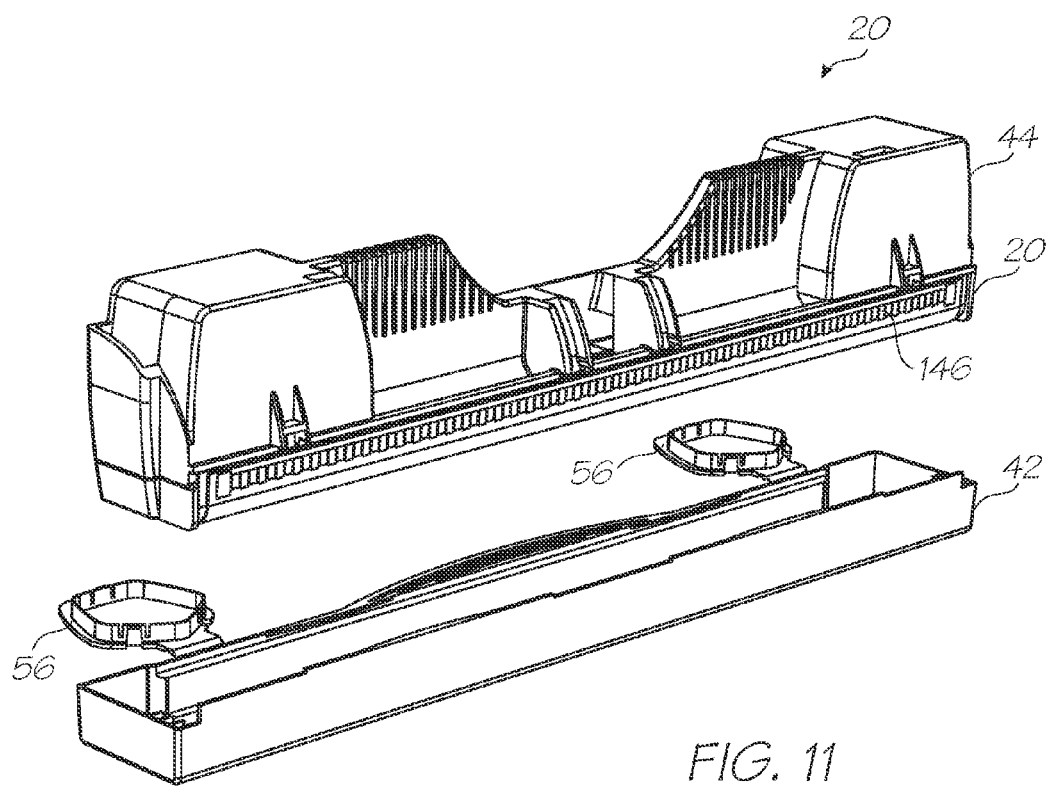
FIG. 11 is a perspective view of the printhead cartridge shown in FIG. 10 with a protective casing removed.

FIG. 11 shows the printhead cartridge 20 with its protective cover 42 removed to expose the printhead ICs 100 (not shown in FIG. 11) on a bottom surface and the line of contacts 146 on a side surface.

Figure 12:
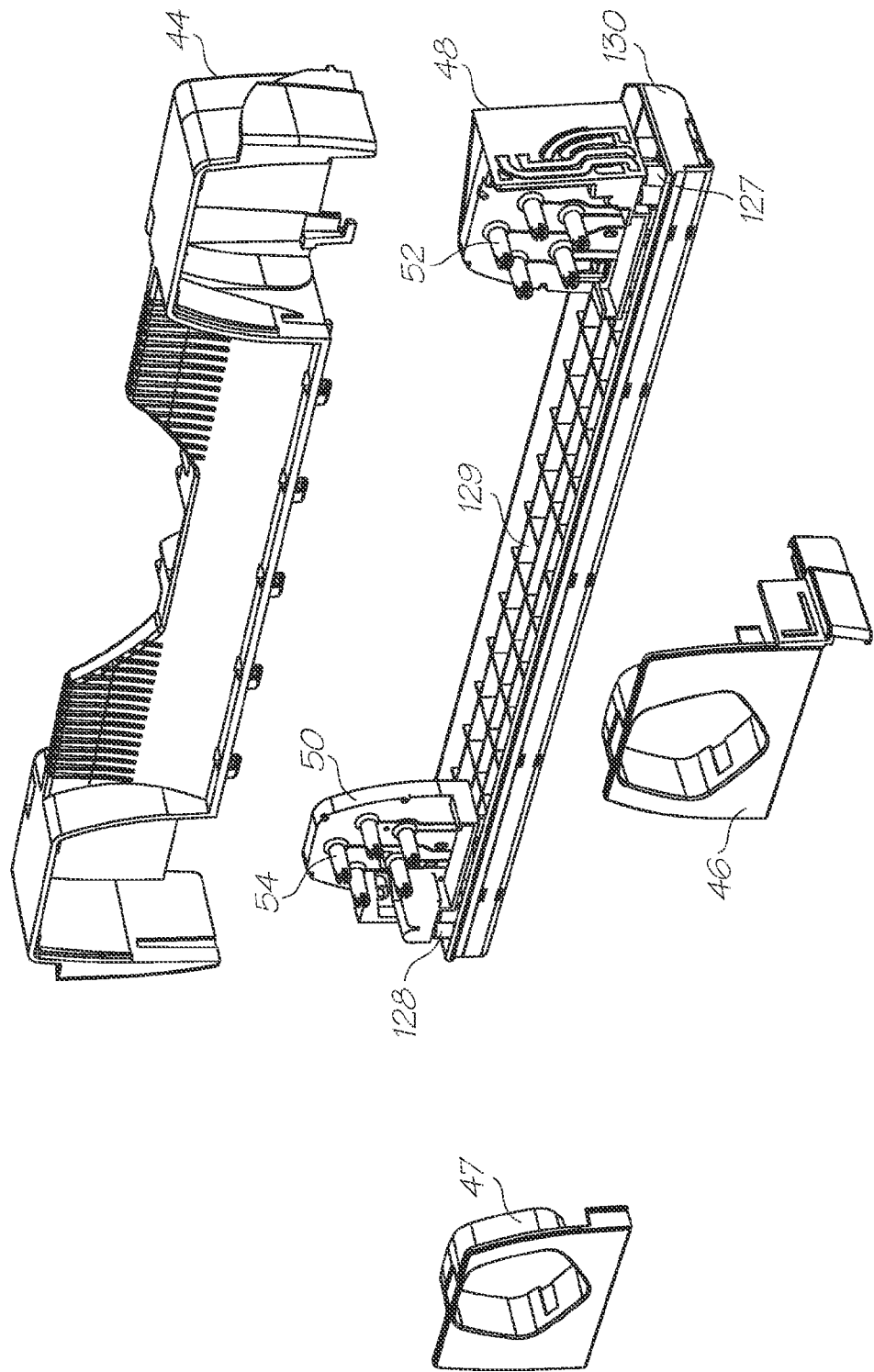
FIG. 12 is an exploded perspective view of the printhead cartridge shown in FIG. 10.

FIG. 12 is a partially exploded perspective of the printhead assembly 20. The top cover 44 has been removed to reveal the inlet manifold 48 and the outlet manifold 50. The inlet and outlet shrouds 46 and 47 have been removed to expose the five inlet and outlet spouts (52 and 54). The inlet and outlet manifolds 48 and 50 form a fluid connection between each of the individual inlets and outlets and a corresponding main channel (see 126 in FIG. 7) in the LCP channel molding 124.

Figure 13:
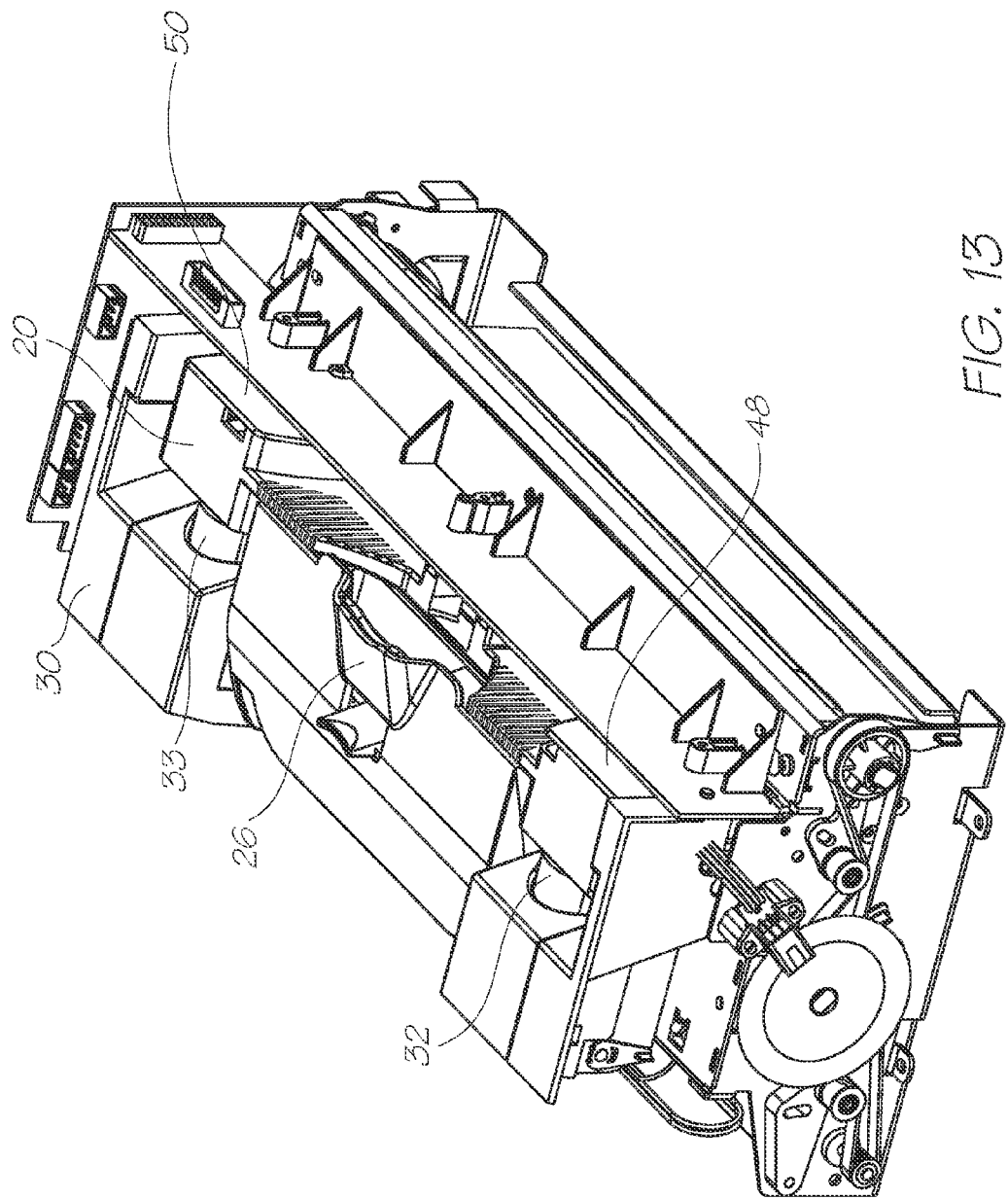
FIG. 13 is a front perspective of a print engine with an installed printhead cartridge.

FIG. 13 shows a print engine 30 of the type that uses the printhead cartridge 20. The print engine 30 is the internal structure of an inkjet printer and therefore does not include any external casing, ink tanks or media feed and collection trays. The printhead cartridge 20 is inserted and removed by the user lifting and lowering a latch 26. The print engine 30 forms an electrical connection with 146 contacts on the printhead cartridge 20. The print engine forms a fluid coupling via an inlet socket 32 and an outlet socket 33, which are connected to the inlet manifold 48 and outlet manifold 50 of the printhead cartridge 20.

Figure 14:
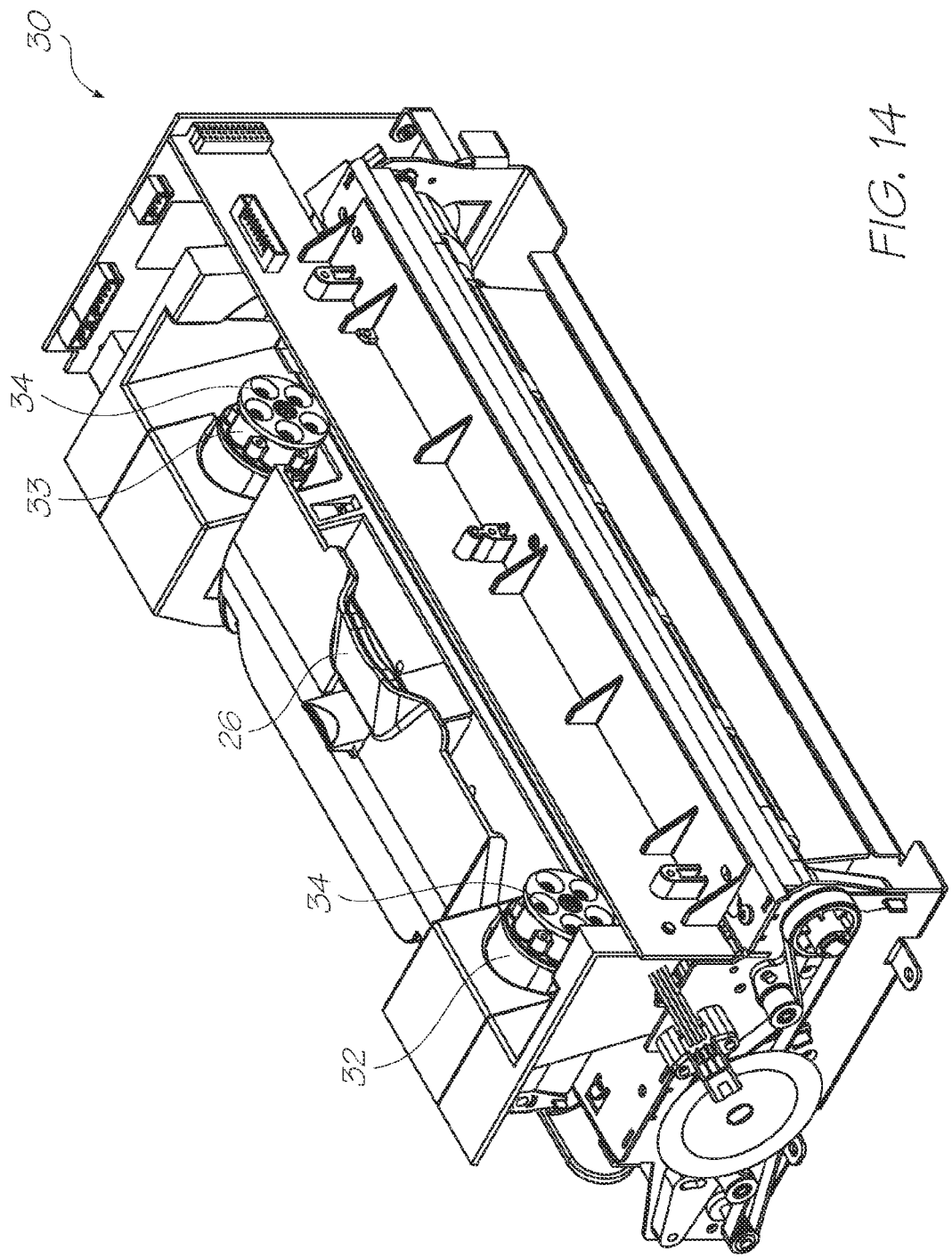
FIG. 14 is a front perspective of the print engine shown in FIG. 13 with the printhead cartridge removed.

FIG. 14 shows the print engine 30 with the printhead cartridge removed to reveal the apertures 34 in each of the sockets 32 and 33. Each aperture 34 receives one of the spouts 52 (see FIG. 12) on the inlet and outlet manifolds. Ink tanks have an arbitrary position and configuration but simply connect to hollow spigots 124 (not shown) at the rear of the sockets 32 in the inlet coupling. A spigot at the rear of socket in the outlet coupling 33 leads to a downstream ink line.

Connections of ink tanks to the inlet spouts 52 of the inlet manifold 48 (via the inlet socket 32) determine the plumbing arrangement of color planes in the printhead. For example, one black ink tank may supply ink to two inlet spouts 52 of the inlet manifold 48 so as to provide two black color planes in the printhead. Alternatively, each black color plane of the printhead may have a respective black ink tank.

Figure 15:
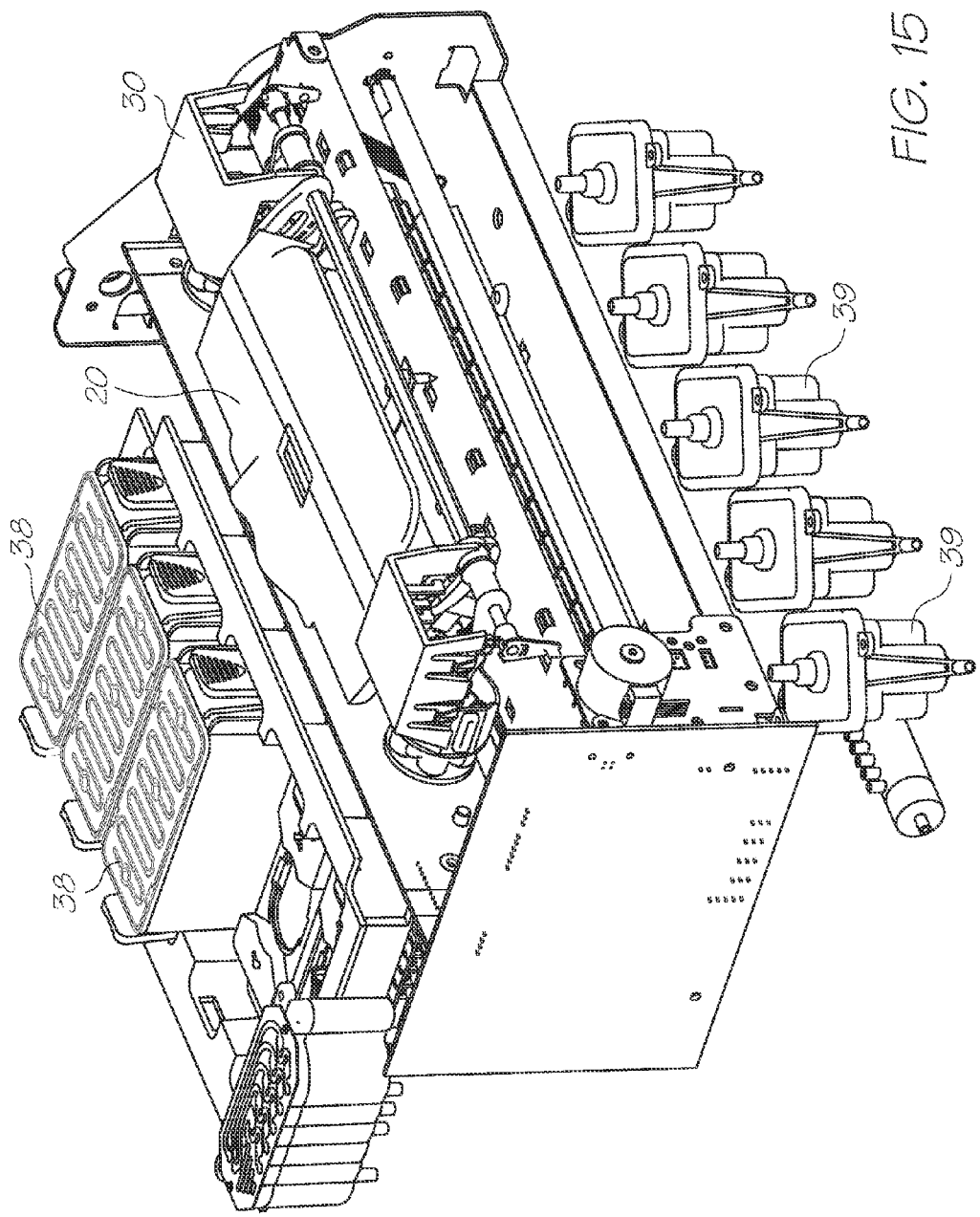
FIG. 15 is a rear perspective the print engine shown in FIG. 13 including ink delivery components.

FIG. 15 shows the print engine 30 with an installed bank of user-replaceable ink tanks 38 and corresponding pressure-regulating chambers 39 for regulation of a hydrostatic pressure of ink supplied to the printhead. Although fluidic connections between the various components are not shown in FIG. 15, it will be appreciated that these connections are made with suitable hoses in accordance with the fluidics system described in, for example, U.S. application Ser. No. 12/062,514, the contents of which are herein incorporated by reference.

Figure 16:
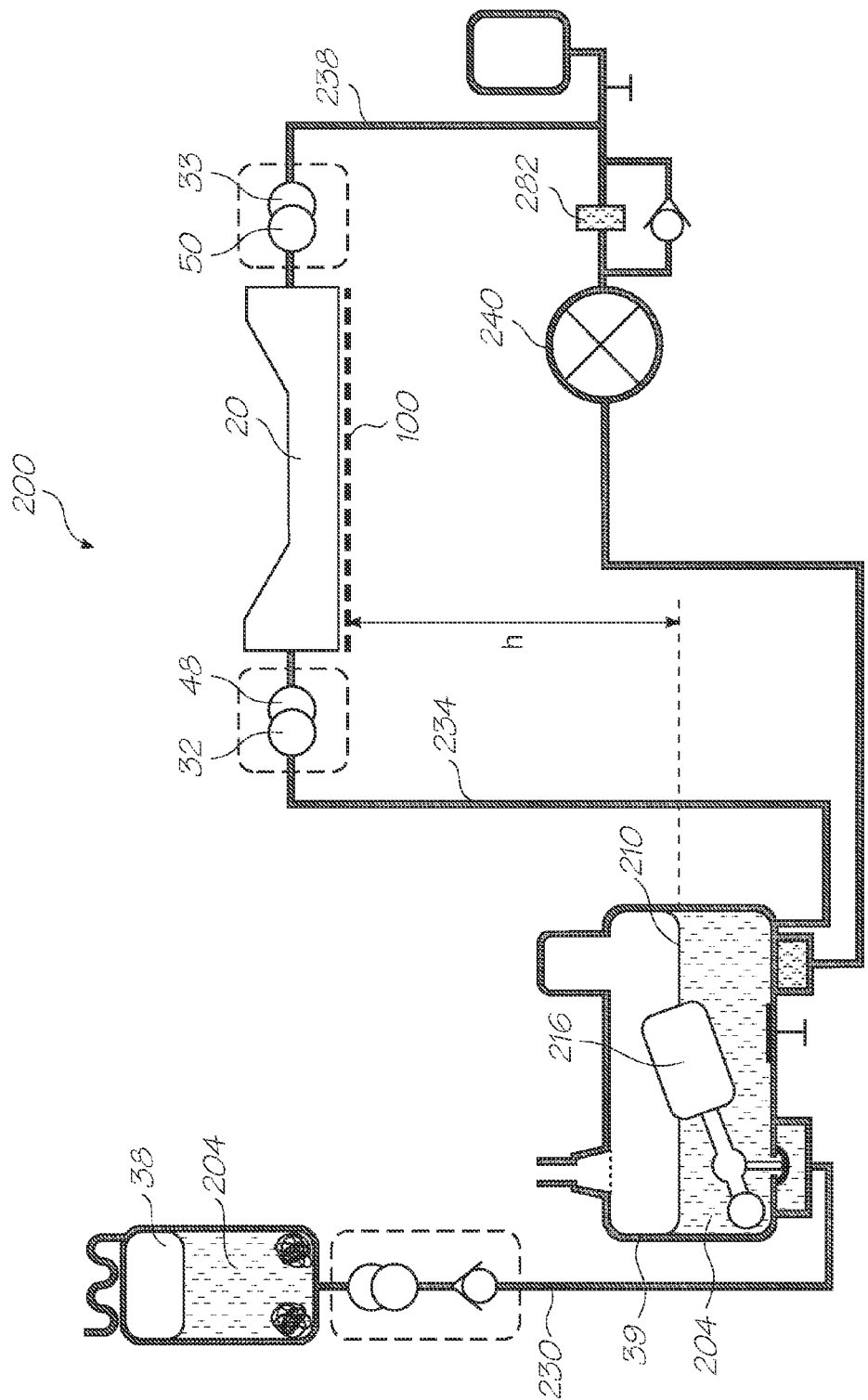
FIG. 16 is a schematic overview of an ink delivery system for a inkjet printer.

FIG. 16 shows schematically a fluidics system 200 of the printer engine shown in FIG. 15. The pressure-regulating chamber 39 supplies ink 204 to the ink inlet 48 of the printhead cartridge 20 via an upstream ink line 234. The pressure-regulating chamber 39 is positioned below the printhead cartridge 20 and maintains a predetermined set level 210 of ink therein by means of a float valve 216.

Ink 204 is supplied to the pressure-regulating chamber 39 by the ink tank 38 positioned at any height h above the set level 210. The ink tank 38 is typically a user-replaceable ink cartridge, which connects with an ink supply line 230 when installed in the printer. The ink supply line 230 provides fluidic communication between the ink reservoir 38 and an inlet port of the pressure-regulating chamber 39.

The ink outlet 50 of the printhead cartridge 20 is connected to a downstream ink line 238, which feeds back to a return port of the chamber 39. The downstream ink line comprises an inline a filter 282 and ink pump 240 for controlling priming and de-priming operations.

Inkjet Inks

The inks utilized in the present invention are typically dye-based or pigment-based aqueous inkjet inks.

Inkjet dyes will be well-known to the person skilled in the art and the present invention is not limited to any particular type of dye. By way of example, dyes suitable for use in the present invention include azo dyes (e.g. Food Black 2), metal complex dyes, naphthol dyes, anthraquinone dyes, indigo dyes, carbonium dyes, quinone-imine dyes, xanthene dyes, cyanine dyes, quinoline dyes, nitro dyes, nitroso dyes, benzoquinone dyes, naphthoquinone dyes, phthalocyanine dyes (including naphthalocyanine dyes), and metal phthalocyanine dyes (including metal naphthalocyanine dyes, such as those described in U.S. Pat. No. 7,148,345, the contents of which is herein incorporated by reference).

Examples of suitable dyes include: CI Direct Black 4, 9, 11, 17, 19, 22, 32, 80, 151, 154, 168, 171, 194 and 195; CI Direct Blue 1, 2, 6, 8, 22, 34, 70, 71, 76, 78, 86, 142, 199, 200, 201, 202, 203, 207, 218, 236 and 287; CI Direct Red 1, 2, 4, 8, 9, 11, 13, 15, 20, 28, 31, 33, 37, 39, 51, 59, 62, 63, 73, 75, 80, 81, 83, 87, 90, 94, 95, 99, 101, 110, 189, 225 and 227; CI Direct Yellow 1, 2, 4, 8, 11, 12, 26, 27, 28, 33, 34, 41, 44, 48, 86, 87, 88, 132, 135, 142 and 144; CI Food Black 1 and 2; CI Acid Black 1, 2, 7, 16, 24, 26, 28, 31, 48, 52, 63, 107, 112, 118, 119, 121, 172, 194 and 208; CI Acid Blue 1, 7, 9, 15, 22, 23, 27, 29, 40, 43, 55, 59, 62, 78, 80, 81, 90, 102, 104, 111, 185 and 254; CI Acid Yellow 1, 3, 4, 7, 11, 12, 13, 14, 19, 23, 25, 34, 38, 41, 42, 44, 53, 55, 61, 71, 76 and 79; CI Reactive Blue 1, 2, 3, 4, 5, 6, 7, 8, 9, 13, 14, 15, 17, 18, 19, 20, 21, 25, 26, 27, 28, 29, 31, 32, 33, 34, 37, 38, 39, 40, 41, 43, 44 and 46; CI Reactive Red 1, 2, 3, 4, 5, 6, 7, 8, 11, 12, 13, 15, 16, 17, 19, 20, 21, 22, 23, 24, 28, 29, 31, 32, 33, 34, 35, 36, 37, 38, 39, 40, 41, 42, 43, 44, 45, 46, 49, 50, 58, 59, 63, 64, and 180; CI Reactive Yellow 1, 2, 3, 4, 6 7, 11, 12, 13, 14, 15, 16, 17, 18, 22, 23, 24, 25, 26, 27, 37 and 42; CI Reactive Black 1, 3, 4, 5, 6, 8, 9, 10, 12, 13, 14 and 18; Pro-Jet® Fast Cyan 2 (Fujifilm Imaging Colorants); Pro-Jet® Fast Magenta 2 (Fujifilm Imaging Colorants); Pro-Jet® Fast Yellow 2 (Fujifilm Imaging Colorants); and Pro-Jet® Fast Black 2 (Fujifilm Imaging Colorants)

Conventional pigments suitable for use in the present invention may be inorganic pigments or organic pigments. Examples of conventional pigments are carbon black, Cadmium Red, Molybdenum Red, Chrome Yellow, Cadmium Yellow, Titan Yellow, chromium oxide, Viridian, Titan Cobalt Green, Ultramarine Blue, Prussian Blue, Cobalt Blue, diketopyrrolo-pyrrole, anthraquinone, benzimidazolone, anthrapyrimidine, azo pigments, phthalocyanine pigments (including naphthlocyanine pigments), uinacridone pigments, isoindolinone pigments, dioxazine pigments, indanthrene pigments, perylene pigments, perinone pigments, thioindigo pigments, quinophthalone pigments, and metal complex pigments.

Examples of suitable pigments include: Cyan COJ450 (Cabot), D71C and D75C (Diamond Dispersions); Magenta COJ465 (Cabot), D71M, D75M, D71PV19 (Diamond Dispersions), Hostajet Magenta E-PT VP2690 and Hostajet Magenta E5B-PT VP3565 (Clariant); Yellow COJ270 and COJ470 (Cabot), or D71Y, D71Y155, D75Y (Diamond Dispersions) and Hostajet Yellow 4G-PT VP2669 (Clariant); Black CW1, CW2, CW3 (Orient) or COJ200, COJ300, COJ400 (Cabot) or SDP1000, SDP2000 (Sensient), or D71K, D75K, D77K, D80K (Diamond Dispersions) and Hostajet Black O-PT (Clariant); Red D71R (Diamond Dispersions); Blue D71B (Diamond Dispersions)

Typically, the pigments are self-dispersing pigments, such as surface-modified pigments. The surface modification may be either anionic group or a cationic. Typical surface-modifying groups are carboxylate and sulfonate groups. However, other surface-modifying groups may also be used, such as anionic phosphate groups or cationic ammonium groups.

Specific examples of suitable aqueous surface-modified pigment dispersions for use in the present invention are Sensijet® Black SDP 2000 (available from Sensient Colors Inc.) and CAB-O-JET® 200, 300, 250C, 260M and 270Y (available from Cabot Corporation).

The average particle size of pigment particles in inkjet inks is optionally in the range of 50 to 500 nm.

Pigments and dyes may be used in inkjet inks either individually or as a combination of two or more thereof.

Ink vehicles for inkjet inks will be well known to the person skilled in the art and the ink vehicles used in the present invention are not particularly limited. The ink vehicles used in the present invention are typically conventional aqueous ink vehicles comprising at least 40 wt % water, at least 50 wt % water or at least 60 wt % water. Usually, the amount of water present in the inkjet ink is in the range of 50 wt % to 90 wt %, or optionally in the range of 60 wt % to 80 wt %.

Aqueous inkjet inks compositions are well known in the literature and, in addition to water, may comprise other components, such as co-solvents (including humectants, penetrants, wetting agents etc.), surfactants, biocides, sequestering agents, pH adjusters, viscosity modifiers, etc.

Co-solvents are typically water-soluble organic solvents. Suitable water-soluble organic solvents include $C_{1-4}$ alkyl alcohols, such as ethanol, methanol, butanol, propanol, and 2-propanol; glycol ethers, such as ethylene glycol monomethyl ether, ethylene glycol monoethyl ether, ethylene glycol monobutyl ether, ethylene glycol monomethyl ether acetate, diethylene glycol monomethyl ether, diethylene glycol monoethyl ether, diethylene glycol mono-n-propyl ether, ethylene glycol mono-isopropyl ether, diethylene glycol mono-isopropyl ether, ethylene glycol mono-n-butyl ether, diethylene glycol mono-n-butyl ether, triethylene glycol mono-n-butyl ether, ethylene glycol mono-t-butyl ether, diethylene glycol mono-t-butyl ether, 1-methyl-1-methoxybutanol, propylene glycol monomethyl ether, propylene glycol monoethyl ether, propylene glycol mono-t-butyl ether, propylene glycol mono-n-propyl ether, propylene glycol mono-isopropyl ether, dipropylene glycol monomethyl ether, dipropylene glycol monoethyl ether, dipropylene glycol mono-n-propyl ether, dipropylene glycol mono-isopropyl ether, dipropylene glycol mono-n-butyl ether, and dipropylene glycol mono-n-butyl ether; formamide, acetamide, dimethyl sulfoxide, sorbitol, sorbitan, glycerol monoacetate, glycerol diacetate, glycerol triacetate, and sulfolane; or combinations thereof.

Other useful water-soluble organic solvents, which may be used as co-solvents, include polar solvents, such as 2-pyrrolidone, N-methylpyrrolidone, ε-caprolactam, dimethyl sulfoxide, sulfolane, morpholine, N-ethylmorpholine, 1,3-dimethyl-2-imidazolidinone and combinations thereof.

The inkjet ink may contain a high-boiling water-soluble organic solvent as a co-solvent, which can serve as a wetting agent or humectant for imparting water retentivity and wetting properties to the ink composition. Such a high-boiling water-soluble organic solvent includes one having a boiling point of 180° C. or higher. Examples of the water-soluble organic solvent having a boiling point of 180° C. or higher are ethylene glycol, propylene glycol, diethylene glycol, pentamethylene glycol, trimethylene glycol, 2-butene-1,4-diol, 2-ethyl-1,3-hexanediol, 2-methyl-2,4-pentanediol, tripropylene glycol monomethyl ether, dipropylene glycol monoethyl glycol, dipropylene glycol monoethyl ether, dipropylene glycol monomethyl ether, dipropylene glycol, triethylene glycol monomethyl ether, tetraethylene glycol, triethylene glycol, diethylene glycol monobutyl ether, diethylene glycol monoethyl ether, diethylene glycol monomethyl ether, tripropylene glycol, polyethylene glycols having molecular weights of 2000 or lower, 1,3-propylene glycol, isopropylene glycol, isobutylene glycol, 1,4-butanediol, 1,3-butanediol, 1,5-pentanediol, 1,6-hexanediol, glycerol, erythritol, pentaerythritol and combinations thereof.

Other suitable wetting agents or humectants include saccharides (including monosaccharides, oligosaccharides and polysaccharides) and derivatives thereof (e.g. maltitol, sorbitol, xylitol, hyaluronic salts, aldonic acids, uronic acids etc.)

The inkjet ink may also contain a penetrant, as one of the co-solvents, for accelerating penetration of the aqueous ink into the recording medium. Suitable penetrants include polyhydric alcohol alkyl ethers (glycol ethers) and/or 1,2-alkyldiols. Examples of suitable polyhydric alcohol alkyl ethers are ethylene glycol monomethyl ether, ethylene glycol monoethyl ether, ethylene glycol monobutyl ether, ethylene glycol monomethyl ether acetate, diethylene glycol monomethyl ether, diethylene glycol monoethyl ether, ethylene glycol mono-n-propyl ether, ethylene glycol mono-isopropyl ether, diethylene glycol mono-isopropyl ether, ethylene glycol mono-n-butyl ether, diethylene glycol mono-n-butyl ether, triethylene glycol mono-n-butyl ether, ethylene glycol mono-t-butyl ether, diethylene glycol mono-t-butyl ether, 1-methyl-1-methoxybutanol, propylene glycol monomethyl ether, propylene glycol monoethyl ether, propylene glycol mono-t-butyl ether, propylene glycol mono-n-propyl ether, propylene glycol mono-isopropyl ether, dipropylene glycol monomethyl ether, dipropylene glycol monoethyl ether, dipropylene glycol mono-n-propyl ether, dipropylene glycol mono-isopropyl ether, propylene glycol mono-n-butyl ether, and dipropylene glycol mono-n-butyl ether. Examples of suitable 1,2-alkyldiols are 1,2-pentanediol and 1,2-hexanediol. The penetrant may also be selected from straight-chain hydrocarbon diols, such as 1,3-propanediol, 1,4-butanediol, 1,5-pentanediol, 1,6-hexanediol, 1,7-heptanediol, and 1,8-octanediol. Glycerol may also be used as a penetrant.

Typically, the amount of co-solvent present in the ink is in the range of about 5 wt % to 40 wt %, or optionally 10 wt % to 30 wt %. A specific example of a co-solvent system, which may be used in the present invention, comprises ethylene glycol, 2-pyrrolidone, glycerol and 1-propanol.

The inkjet ink may also contain one or more surface active agents ("surfactant"), such as an anionic surface active agent, a zwitterionic surface active agent, a nonionic surface active agent or mixtures thereof. Useful anionic surface active agents include sulfonic acid types, such as alkanesulfonic acid salts, α-olefinsulfonic acid salts, alkylbenzenesulfonic acid salts, alkylnaphthalenesulfonic acids, acylmethyltaurines, and dialkylsulfosuccinic acids; alkylsulfuric ester salts, sulfated oils, sulfated olefins, polyoxyethylene alkyl ether sulfuric ester salts; carboxylic acid types, e.g., fatty acid salts and alkylsarcosine salts; and phosphoric acid ester types, such as alkylphosphoric ester salts, polyoxyethylene alkyl ether phosphoric ester salts, and glycerophosphoric ester salts. Specific examples of the anionic surface active agents are sodium dodecylbenzenesulfonate, sodium laurate, and a polyoxyethylene alkyl ether sulfate ammonium salt.

Examples of zwitterionic surface active agents include N,N-dimethyl-N-octyl amine oxide, N,N-dimethyl-N-dodecyl amine oxide, N,N-dimethyl-N-tetradecyl amine oxide, N,N-dimethyl-N-hexadecyl amine oxide, N,N-dimethyl-N-octadecyl amine oxide and N,N-dimethyl-N—(Z-9-octadecenyl)-N-amine oxide.

Examples of nonionic surface active agents include ethylene oxide adduct types, such as polyoxyethylene alkyl ethers, polyoxyethylene alkylphenyl ethers, polyoxyethylene alkyl esters, and polyoxyethylene alkylamides; polyol ester types, such as glycerol alkyl esters, sorbitan alkyl esters, and sugar alkyl esters; polyether types, such as polyhydric alcohol alkyl ethers; and alkanolamide types, such as alkanolamine fatty acid amides. Specific examples of nonionic surface active agents are ethers such as polyoxyethylene nonylphenyl ether, polyoxyethylene octylphenyl ether, polyoxyethylene dodecylphenyl ether, polyoxyethylene alkylallyl ether, polyoxyethylene oleyl ether, polyoxyethylene lauryl ether, and polyoxyalkylene alkyl ethers (e.g. polyoxyethylene alkyl ethers); and esters, such as polyoxyethylene oleate, polyoxyethylene oleate ester, polyoxyethylene distearate, sorbitan laurate, sorbitan monostearate, sorbitan mono-oleate, sorbitan sesquioleate, polyoxyethylene mono-oleate, and polyoxyethylene stearate. Acetylene glycol surface active agents, such as 2,4,7,9-tetramethyl-5-decyne-4,7-diol; ethoxylated 2,4,7,9-tetramethyl-5-decyne-4,7-diol; 3,6-dimethyl-4-octyne-3,6-diol or 3,5-dimethyl-1-hexyn-3-ol, may also be used. Specific examples of nonionic surfactants, which may be used in the present invention, are Surfynol® 465 and Surfynol® 440 (available from Air Products and Chemicals, Inc)

The surfactant(s) are typically present in the aqueous inkjet ink in an amount ranging from 0.1 wt % to 2 wt %. As described above, the amount of surfactant in relatively low luminance inks is at least 0.4 wt. % greater than the amount of surfactant in relatively high luminance inks. Typically, color inks have at least 0.4 wt. % more surfactant than black ink in a given ink set.

The aqueous inkjet ink may also include a pH adjuster or buffer, such as sodium hydroxide, potassium hydroxide, lithium hydroxide, sodium carbonate, sodium hydrogencarbonate, potassium carbonate, potassium hydrogencarbonate, lithium carbonate, sodium phosphate, potassium phosphate, lithium phosphate, potassium dihydrogenphosphate, dipotassium hydrogenphosphate, sodium oxalate, potassium oxalate, lithium oxalate, sodium borate, sodium tetraborate, potassium hydrogenphthalate, and potassium hydrogentartrate; ammonia; and amines, such as methylamine, ethylamine, diethylamine, trimethylamine, triethylamine, tris(hydroxymethyl)aminomethane hydrochloride, triethanolamine, diethanolamine, diethylethanolamine, triisopropanolamine, butyldiethanolamine, morpholine, propanolamine, 4-morpholineethanesulfonic acid and 4-morpholinepropanesulfonic acid ("MOPS"). The amount of pH adjuster, when present, is typically in the range of from 0.01 to 2 wt. % or 0.05 to 1 wt. %.

The aqueous inkjet ink may also include a biocide, such as benzoic acid, dichlorophene, hexachlorophene, sorbic acid, hydroxybenzoic esters, sodium dehydroacetate, 1,2-benthiazolin-3-one ("Proxel® GXL", available from Arch Chemicals, Inc.), 3,4-isothiazolin-3-one or 4,4-dimethyloxazolidine. The amount of pH adjuster, when present, is typically in the range of from 0.01 to 2 wt. % or 0.05 to 1 wt. %.

The aqueous inkjet ink may also contain a sequestering agent, such as ethylenediaminetetraacetic acid (EDTA).

Experimental Section

The following experimental section demonstrates the problems of adverse color mixing on nozzle plates of Memjet® printheads, and further demonstrates the advantages of particular ink sets in combination with printhead plumbing configurations optimized for minimizing adverse color mixing.

A number of different ink sets, each containing CMYK inks, were prepared for testing. Each ink was formulated by mixing ink vehicle components in a glass bottle and stirring for 24 hours. The ink vehicles were added to requisite colorants, stirred for a further 15 minutes, and then filtered. Both dye-based and pigment-based ink sets were prepared. The ink sets had the following formulations:

| Ink Set 1 | | | | |
|---|---|---|---|---|
| | 1Y | 1K | 1C | 1M |
| Ethylene glycol | 10 parts | 10 parts | 10 parts | 10 parts |
| 2-pyrrolidinone | 9 parts | 9 parts | 9 parts | 9 parts |
| Glycerol | 3 parts | 3 parts | 3 parts | 3 parts |
| 1-Propanol | 3 parts | 3 parts | 3 parts | 3 parts |
| Yellow dye | 4 parts | | | |
| Black dye | | 6 parts | | |
| Cyan dye | | | 5 parts | |
| Magenta dye | | | | 4 parts |
| Surfynol 465 | 1.0 parts | 0.2 parts | 1.0 parts | 1.0 parts |
| Proxel GXL | 0.2 parts | 0.2 parts | 0.2 parts | 0.2 parts |
| MOPS | 0.2 parts | 0.2 parts | 0.2 parts | 0.2 parts |
| Water | To 100 parts | To 100 parts | To 100 parts | To 100 parts |
| Surface Tension at 25° C. (mN/m) | 33.4 | 39.7 | 34.1 | 37.4 |

| Ink Set 2 | | | | |
|---|---|---|---|---|
| | 2Y | 2K | 2C | 2M |
| Ethylene glycol | 10 parts | 13 parts | 10 parts | 10 parts |
| 2-pyrrolidinone | 9 parts | 9 parts | 9 parts | 9 parts |
| Glycerol | 3 parts | 3.2 parts | 3 parts | 3 parts |
| 1-Propanol | 3 parts | 3 parts | 3 parts | 3 parts |
| Yellow dye | 4 parts | | | |
| Black dye | | 6 parts | | |
| Cyan dye | | | 5 parts | |
| Magenta dye | | | | 4 parts |
| Surfynol 465 | 0.8 parts | 0.2 parts | 0.8 parts | 0.8 parts |
| Proxel GXL | 0.2 parts | 0.2 parts | 0.2 parts | 0.2 parts |
| MOPS | 0.2 parts | 0.2 parts | 0.2 parts | 0.2 parts |
| Water | To 100 parts | To 100 parts | To 100 parts | To 100 parts |
| Surface Tension at 25° C. (mN/m) | 33.1 | 39.7 | 34.0 | 37.4 |

| Ink Set 3 | | | | |
|---|---|---|---|---|
| | 3Y | 3K | 3C | 3M |
| Ethylene glycol | 10 parts | 10 parts | 10 parts | 10 parts |
| 2-pyrrolidinone | 9 parts | 9 parts | 9 parts | 9 parts |
| Glycerol | 3 parts | 3 parts | 3 parts | 3 parts |
| Yellow pigment | 5 parts | | | |
| Black pigment | | 5 parts | | |
| Cyan pigment | | | 3.5 parts | |
| Magenta pigment | | | | 5 parts |
| Surfynol 465 | 1.0 parts | 0.2 parts | 1.0 parts | 1.0 parts |
| Water | To 100 parts | To 100 parts | To 100 parts | To 100 parts |
| Surface Tension at 25° C. (mN/m) | 33.1 | 40.8 | 34.2 | 35.5 |

| Comparative Ink Set 1 | | | | |
|---|---|---|---|---|
| | Comp 1Y | Comp 1K | Comp 1C | Comp 1M |
| Ethylene glycol | 10 parts | 25 parts | 10 parts | 10 parts |
| 2-pyrrolidinone | 9 parts | | 9 parts | 9 parts |
| Glycerol | 3 parts | | 3 parts | 3 parts |
| 1-Propanol | 3 parts | | 3 parts | 3 parts |
| Yellow dye | 4 parts | | | |
| Black dye | | 6 parts | | |
| Cyan dye | | | 5 parts | |
| Magenta dye | | | | 4 parts |
| Surfynol 465 | 1.0 parts | | 0.2 parts | 1.0 parts |
| Proxel GXL | 0.2 parts | 0.2 parts | 0.2 parts | 0.2 parts |
| MOPS | 0.2 parts | 0.2 parts | 0.2 parts | 0.2 parts |
| Water | To 100 parts | To 100 parts | To 100 parts | To 100 parts |
| Surface Tension at 25° C. (mN/m) | 33.4 | 63.5 | 39.7 | 38.7 |

| Comparative Ink Set 2 | | | | |
|---|---|---|---|---|
| | Comp 2Y | Comp 2K | Comp 2C | Comp 2M |
| Ethylene glycol | 10 parts | 10 parts | 10 parts | 10 parts |
| 2-pyrrolidinone | 9 parts | 9 parts | 9 parts | 9 parts |
| Glycerol | 3 parts | 3 parts | 3 parts | 3 parts |
| 1-Propanol | 3 parts | 3 parts | 3 parts | 3 parts |
| Yellow dye | 4 parts | | | |
| Black dye | | 6 parts | | |
| Cyan dye | | | 5 parts | |
| Magenta dye | | | | 4 parts |
| Surfynol 465 | 0.2 parts | 0.2 parts | 0.2 parts | 1.0 parts |
| Proxel GXL | 0.2 parts | 0.2 parts | 0.2 parts | 0.2 parts |
| MOPS | 0.2 parts | 0.2 parts | 0.2 parts | 0.2 parts |
| Water | To 100 parts | To 100 parts | To 100 parts | To 100 parts |
| Surface Tension at 25° C. (mN/m) | 38.8 | 39.7 | 38.6 | 37.4 |

| Comparative Ink Set 3 | | | | |
|---|---|---|---|---|
| | Comp 3Y | Comp 3K | Comp 3C | Comp 3M |
| Ethylene glycol | 10 parts | 13 parts | 10 parts | 10 parts |
| 2-pyrrolidinone | 9 parts | 9 parts | 9 parts | 9 parts |
| Glycerol | 3 parts | 3.2 parts | 3 parts | 3 parts |
| Yellow dye | 4 parts | | | |
| Black dye | | 6 parts | | |
| Cyan dye | | | 5 parts | |
| Magenta dye | | | | 4 parts |

-continued

| Comparative Ink Set 3 | | | | |
|---|---|---|---|---|
| | Comp 3Y | Comp 3K | Comp 3C | Comp 3M |
| Surfynol 465 | 0.2 parts | 0.2 parts | 0.2 parts | 1.0 parts |
| Proxel GXL | 0.2 parts | 0.2 parts | 0.2 parts | 0.2 parts |
| MOPS | 0.2 parts | 0.2 parts | 0.2 parts | 0.2 parts |
| Water | To 100 parts | To 100 parts | To 100 parts | To 100 parts |
| Surface Tension at 25° C. (mN/m) | 38.7 | 40.5 | 38.9 | 39.8 |

| Comparative Ink Set 4 | | | | |
|---|---|---|---|---|
| | Comp 4Y | Comp 4K | Comp 4C | Comp 4M |
| Ethylene glycol | 10 parts | 10 parts | 10 parts | 10 parts |
| 2-pyrrolidinone | 9 parts | 9 parts | 9 parts | 9 parts |
| Glycerol | 3 parts | 3 parts | 3 parts | 3 parts |
| Yellow pigment | 5 parts | | | |
| Black pigment | | 5 parts | | |
| Cyan pigment | | | 3.5 parts | |
| Magenta pigment | | | | 5 parts |
| Surfynol 465 | 0.5 parts | 0.2 parts | 0.5 parts | 0.5 parts |
| Water | To 100 parts | To 100 parts | To 100 parts | To 100 parts |
| Surface Tension at 25° C. (mN/m) | 38.2 | 40 | 36.9 | 40.4 |

The four inks from each ink set were plumbed into a Memjet® printhead so as to supply color planes 1, 2, 3, 4 and 5. In each case, the ink sets were plumbed into the color planes in the order shown in Table 1:

TABLE 1

| Printhead Plumbing Configuration for CMYK ink sets | | | | |
|---|---|---|---|---|
| Color Plane 1 | Color Plane 2 | Color Plane 3 | Color Plane 4 | Color Plane 5 |
| Yellow (Y) | Black (K) | Cyan (C) | Black (K) | Magenta (M) |

A nozzle check pattern of color planes 1-5 was printed to ensure the printhead was primed. Test patterns were then printed to stress each color plane and analyze any color mixing that had occurred in neighboring color planes from the stressed color plane. Typically, a color plane is stressed by printing at full bleed from that color plane, and then nozzle check patterns printed sequentially from each of the color planes 1-5 of the printhead. Thus, a typical test pattern which stresses a black color plane may comprise a black shape (e.g. rectangle or triangle) printed at full bleed to cover most of an A4 sheet, and five lines of yellow, black, cyan, black and magenta (about 1 mm in width) printed immediately below the black shape. Mixing of color plane(s) in the printhead is determined by visually inspecting the nozzle check patterns (10× magnification) as well as the printhead nozzle face. Ink mixing is deemed to occur if ink from a stressed color plane has migrated into neighboring color plane(s). For example, if any of the lines of yellow, cyan and magenta in the test pattern contain streaks of black, then adverse color mixing on the nozzle face is deemed to have occurred.

The results color mixing experiments are shown in Tables 2-8 below. In Tables 2-8, each column header of the table shows the stressed color plane and each row of the table shows a neighboring color plane (if any) into which the stressed color plane has mixed during the experiment. By way of nomenclature, a '0' indicates no color mixing and 'X' indicates color mixing.

TABLE 2

Analysis of Ink Set 1

| | Stressed color plane | | | | |
|---|---|---|---|---|---|
| Mixing color plane | 1 | 2 | 3 | 4 | 5 |
| 1 | N/A | 0 | 0 | 0 | 0 |
| 2 | 0 | N/A | X | 0 | 0 |
| 3 | 0 | 0 | N/A | 0 | 0 |
| 4 | 0 | 0 | 0 | N/A | X |
| 5 | 0 | 0 | 0 | 0 | N/A |

For Ink Set 1, no color mixing was observed from either of the black color planes 2 and 4 into neighboring color planes. The only color mixing observed was from the magenta color plane 5 into the neighboring black color plane 4, and from the cyan color plane 3 into the neighboring black color plane 2. This color mixing is considered to be acceptable, because it does not adversely affect the visual appearance of printed black dots.

TABLE 3

Analysis of Ink Set 2

| | Stressed color plane | | | | |
|---|---|---|---|---|---|
| Mixing color plane | 1 | 2 | 3 | 4 | 5 |
| 1 | N/A | 0 | 0 | 0 | 0 |
| 2 | X | N/A | X | 0 | 0 |
| 3 | 0 | 0 | N/A | 0 | 0 |
| 4 | 0 | 0 | X | N/A | X |
| 5 | 0 | 0 | 0 | 0 | N/A |

TABLE 4

Analysis of Ink Set 3

| Mixing color plane | Stressed color plane | | | | |
|---|---|---|---|---|---|
| | 1 | 2 | 3 | 4 | 5 |
| 1 | N/A | 0 | 0 | 0 | 0 |
| 2 | X | N/A | X | 0 | 0 |
| 3 | 0 | 0 | N/A | 0 | 0 |
| 4 | 0 | 0 | X | N/A | X |
| 5 | 0 | 0 | 0 | 0 | N/A |

For Ink Sets 2 and 3, no color mixing was observed from either of the black color planes 2 and 4 into neighboring color planes. Color mixing observed was from the magenta color plane 5 into the neighboring black color plane 4, from the cyan color plane 3 into both neighboring black color planes 2 and 4, and from the yellow color plane into the neighboring black color plane 2. This color mixing is considered to be acceptable, because it does not adversely affect the visual appearance of printed black dots.

TABLE 5

Analysis of Comparative Ink Set 1

| Mixing color plane | Stressed color plane | | | | |
|---|---|---|---|---|---|
| | 1 | 2 | 3 | 4 | 5 |
| 1 | N/A | 0 | 0 | 0 | 0 |
| 2 | X | N/A | X | 0 | 0 |
| 3 | 0 | X | N/A | X | 0 |
| 4 | 0 | 0 | X | N/A | X |
| 5 | 0 | 0 | 0 | 0 | N/A |

For Comparative Ink Set 1, color mixing was observed from both the black color planes 2 and 4 into the neighboring cyan color plane 3. This color mixing was considered to be unacceptable, because the visual appearance of printed cyan dots was adversely affected by mixing of the black ink.

TABLE 6

Analysis of Comparative Ink Set 2

| Mixing color plane | Stressed color plane | | | | |
|---|---|---|---|---|---|
| | 1 | 2 | 3 | 4 | 5 |
| 1 | N/A | X | 0 | 0 | 0 |
| 2 | X | N/A | X | 0 | 0 |
| 3 | 0 | X | N/A | X | 0 |
| 4 | 0 | 0 | X | N/A | X |
| 5 | 0 | 0 | 0 | 0 | N/A |

TABLE 7

Analysis of Comparative Ink Set 3

| Mixing color plane | Stressed color plane | | | | |
|---|---|---|---|---|---|
| | 1 | 2 | 3 | 4 | 5 |
| 1 | N/A | X | 0 | 0 | 0 |
| 2 | X | N/A | X | 0 | 0 |
| 3 | 0 | X | N/A | X | 0 |
| 4 | 0 | 0 | X | N/A | X |
| 5 | 0 | 0 | 0 | 0 | N/A |

For Comparative Ink Sets 2 and 3, color mixing was observed from both the black color planes 2 and 4 into the neighboring cyan color plane 3. Color mixing was also observed from the black color plane 2 into the neighboring yellow color plane 1. This color mixing was considered to be unacceptable, because the visual appearance of printed cyan and yellow dots was adversely affected by mixing of the black ink.

TABLE 8

Analysis of Comparative Ink Set 4

| Mixing color plane | Stressed color plane | | | | |
|---|---|---|---|---|---|
| | 1 | 2 | 3 | 4 | 5 |
| 1 | N/A | X | 0 | 0 | 0 |
| 2 | X | N/A | X | 0 | 0 |
| 3 | 0 | X | N/A | X | 0 |
| 4 | 0 | 0 | X | N/A | X |
| 5 | 0 | 0 | 0 | X | N/A |

For Comparative Ink Set 4, color mixing was observed from both the black color planes 2 and 4 into the neighboring cyan color plane 3. Color mixing was also observed from the black color plane 2 into the neighboring yellow color plane 1. Color mixing was also observed from the black color plane 4 into the neighboring magenta color plane 5. This color mixing was considered to be unacceptable, because the visual appearance of printed cyan, magenta and yellow dots was adversely affected by mixing of the black ink.

Conclusions

The results shown in Tables 2-8 demonstrate that color mixing is controlled by an amount of surfactant in each ink. In particular, mixing from black ink into neighboring color inks across the nozzle face of the printhead is minimized only if the amount of surfactant in color inks is at least 0.4 wt. % (preferably at least 0.6 wt. %) greater than the amount of surfactant in the black ink.

Surprisingly, the surface tension of each ink appeared to be of lesser importance in controlling the extent and direction of color mixing. For example, the black ink in Comparative Ink Set 1 has a high surface tension of 63.5 mN/m. However, this high surface tension does not prevent black ink from color planes 2 and 4 mixing into cyan ink in color plane 3, and thereby adversely affecting the visual appearance of printed cyan dots. Likewise, in each of the Comparative Ink Sets 2-4, a relatively higher surface tension of black ink does not prevent black ink from mixing into neighboring color plane(s). Accordingly, it was concluded that Marangoni effect does not predict color mixing across the nozzle face of a printhead; only the relative amounts of surfactant in each ink were able to control the extent and direction of color mixing across the nozzle face.

The ink sets described herein together with optimized printhead plumbing arrangements provide improved print quality in multi-color printheads by minimizing adverse color mixing between closely spaced color planes in the printhead.

It will, of course, be appreciated that the present invention has been described by way of example only and that modifications of detail may be made within the scope of the invention as defined in the claims appended hereto.

The invention claimed is:

1. An inkjet printer comprising a stationary inkjet printhead positioned relative to a media feed direction, said printhead comprising a plurality of printhead integrated circuits, each printhead integrated circuit comprising a plurality of color planes for ejecting different inks, each color plane comprising at least one nozzle row defined in a nozzle face of said printhead, each nozzle in a respective color plane being supplied with a same ink, wherein each printhead integrated circuit is plumbed such that a first color plane positioned furthest upstream with respect to the media feed direction ejects yellow ink and a second color plane neighboring the first color plane ejects black ink.

2. The inkjet printer of claim 1 comprising at least two color planes ejecting black ink.

3. The inkjet printer of claim 2, wherein each color plane ejecting a non-black ink has at least one neighboring color plane ejecting a black ink.

4. The inkjet printer of claim 2, wherein a third color plane ejecting a non-black ink is sandwiched between a pair of color planes ejecting black ink.

5. The printer of claim 1, wherein a distance between nozzle rows from neighboring color planes is less than 200 microns.

6. The printer of claim 1, wherein the printhead is plumbed such that color planes across the nozzle face have an alternating sequence of non-black and black inks.

7. The printer of claim 1, wherein the yellow ink contains a greater amount of surfactant than the black ink.

8. The printer of claim 7, wherein the yellow ink contains at least 0.4 wt. % more surfactant than the black ink.

\* \* \* \* \*